United States Patent
Suryanarayana et al.

(10) Patent No.: US 11,431,607 B2
(45) Date of Patent: Aug. 30, 2022

(54) LIVENESS DETECTION AND ROUTE CONVERGENCE IN SOFTWARE-DEFINED NETWORKING DISTRIBUTED SYSTEM

(71) Applicant: Juniper Networks, Inc., Sunnyvale, CA (US)

(72) Inventors: Anantharamu Suryanarayana, San Jose, CA (US); Richard Roberts, Rennes (FR)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/893,168

(22) Filed: Jun. 4, 2020

(65) Prior Publication Data
US 2021/0385149 A1    Dec. 9, 2021

(51) Int. Cl.
*H04L 45/02* (2022.01)
*H04L 12/46* (2006.01)
(Continued)

(52) U.S. Cl.
CPC .......... *H04L 45/02* (2013.01); *H04L 12/4641* (2013.01); *H04L 12/66* (2013.01);
(Continued)

(58) Field of Classification Search
CPC ....... H04L 45/02; H04L 45/04; H04L 45/586; H04L 45/64; H04L 12/4641; H04L 12/66; H04L 49/25; H04L 43/0811
See application file for complete search history.

(56) References Cited

U.S. PATENT DOCUMENTS 10,200,274 B1 * 2/2019 Suryanarayana ....... H04L 49/70
10,237,206 B1   3/2019 Agrawal et al.
(Continued)

FOREIGN PATENT DOCUMENTS

WO    2013184846 A1   12/2013

OTHER PUBLICATIONS

Katz et al., "Bidirectional Forwarding Detection (BFD)," Internet Engineering Task Force (IETF), RFC 5880, Jun. 2010, 49 pp.
(Continued)

*Primary Examiner* — Jianye Wu
(74) *Attorney, Agent, or Firm* — Shumaker & Sieffert, P.A.

(57) ABSTRACT

This disclosure describes techniques for improving speed of network convergence after node failure. In one example, a method includes storing, by SDN controller, an underlay routing table having routes for an underlay network of a data center and an overlay routing table having a set of routes for a virtual network of an overlay network for the data center, wherein the underlay network includes physical network switches, gateway routers, and a set of virtual routers executing on respective compute nodes of the data center; installing, within the underlay routing table, a route to a destination address assigned to a particular one of the virtual routers as an indicator of a reachability status to the particular virtual router in the underlay network. The SDN controller controls, based on presence or absence of the route within the underlay routing table, advertisement of the routes for the virtual network of the overlay network.

20 Claims, 23 Drawing Sheets

(51) Int. Cl.
*H04L 12/66* (2006.01)
*H04L 43/0811* (2022.01)
*H04L 45/00* (2022.01)
*H04L 45/586* (2022.01)
*H04L 45/64* (2022.01)
*H04L 49/25* (2022.01)

(52) U.S. Cl.
CPC .......... *H04L 43/0811* (2013.01); *H04L 45/04* (2013.01); *H04L 45/586* (2013.01); *H04L 45/64* (2013.01); *H04L 49/25* (2013.01)

(56) References Cited

U.S. PATENT DOCUMENTS

| | | | | |
|---|---|---|---|---|
| 2015/0256407 A1* | 9/2015 | Iizawa | ................ | H04L 41/0893 370/254 |
| 2015/0381493 A1* | 12/2015 | Bansal | .................. | H04L 45/745 370/392 |
| 2016/0191374 A1* | 6/2016 | Singh | ...................... | H04L 45/28 370/228 |
| 2021/0112034 A1* | 4/2021 | Sundararajan | ...... | H04L 41/0806 |

OTHER PUBLICATIONS

Mackie et al., "BGP-Signaled End-System IP/VPNs," draft-ietf-l3vpn-end-system-06, Network Working Group, Dec. 15, 2016, 32pp.

Saint-Andre, "Extensible Messaging and Presence Protocol (XMPP): Core," RFC 6120, Internet Engineering Task Force (IETF), Mar. 2011, 211 pp.

Hopps, "Analysis of an Equal-Cost Multi-Path Algorithm," RFC 2992, Network Working Group, Nov. 2000, 8 pp.

Bashandy et al. "BGP Prefix Independent Convergence" draft-ietf-rtgwg-bgp-pic-11.txt, Network Working Group, Internet Draft, Feb. 10, 2020, 30 pp.

"Configuring a One-Arm BFD Echo Session" Huawei Support, available at https://support.huawei.com/enterprise/en/doc/EDOC1100055023/7c510a42/configuring-a-one-arm-bfd-echo-session (last accessed Jun. 3, 2020), Dec. 5, 2018, 3 pp.

"BFD Configuration" Huawei NetEngine40E Universal Service Router, Configuration Guide—Network Reliability, Chapter 3, pp. 14-173, Huawei Technologies Co., Ltd., Dec. 5, 2018.

"tf-specs/5.1/bgpaas-peer-selection.md" GitHub, available at https://github.com/tungstenfabric/tf-specs/blob/master/5.1/bgpaas-peer-selection.md (last accessed Jun. 4, 2020), Apr. 4, 2020, 4 pp.

"contrail-vrouter/include/vr_nexthop.h" GitHub, available at https://github.com/Juniper/contrail-vrouter/blob/master/include/vr_nexthop.h (last accessed Jun. 4, 2020), May 2020, 6pp.

Rekhter et al. "A Border Gateway Protocol 4 (BGP-4)" Network Working Group, RFC 4271, Jan. 2006, 90 pp.

U.S. Appl. No. 16/893,183, filed Jun. 4, 2020 entitled "Local Repair for Underlay Failure Using Prefix Independent Convergence" (inventor: Suryanarayana) Juniper Networks, Inc.

Tojo et al., "Multi-layer SDN Control Technology" NTT Technical Review, vol. 16, No. 8, Aug. 31, 2018, pp. 62-67.

Extended European Search Report received in counterpart EP Application No. 20193160.7 dated Feb. 4, 2021, 12 pp.

Office Action from U.S. Appl. No. 16/893,183, dated Oct. 27, 2021, 12 pp.

Notice of Allowance from U.S. Appl. No. 16/893,183, dated Mar. 2, 2022, 13 pp.

Response to Office Action dated Oct. 27, 2021, from U.S. Appl. No. 16/893,183, filed Jan. 27, 2022, 10 pp.

Response to the Extended European Search Report received in counterpart EP Application No. 20193160.7 dated Feb. 4, 2021, filed May 8, 2022, 24 pp.

* cited by examiner

LIVENESS DETECTION AND ROUTE CONVERGENCE IN SOFTWARE-DEFINED NETWORKING DISTRIBUTED SYSTEM

TECHNICAL FIELD

The disclosure relates to computer networks and, more particularly, to forwarding packets within virtual networks.

BACKGROUND

In a typical cloud data center environment, there is a large collection of interconnected servers that provide computing (e.g., compute nodes) and/or storage capacity to run various applications. For example, a data center comprises a facility that hosts applications and services for customers of the data center. The data center for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Network convergence and fast failover have become instrumental in high performance service provider networking due to the increasing deployment of sensitive applications (e.g., real-time). Software Defined Networking (SDN) platforms may be used in data centers, and in some cases, may use a logically centralized and physically distributed SDN controller, and a distributed forwarding plane in virtual routers that extend the network from physical routers and switches in the data center into a virtual overlay network hosted in virtualized servers (referred to as compute nodes). The SDN controller provides management, control, and analytics functions of a virtualized network and orchestrates the virtual routers by communicating with the virtual routers.

Losing communication between the SDN controller and the virtual routers of the compute nodes may result in degraded or non-functional cloud-based services within the data center environment. Similarly, losing communication between the SDN controller and an SDN gateway may also disrupt delivery of the cloud-based services. The SDN controller may take some time to detect when a compute node or SDN gateway has failed, and once the SDN controller detects the failure, it takes time for the SDN controller to communicate route updates reflecting the failure to other compute nodes and SDN gateways. Meanwhile, other devices in the overlay network will continue sending traffic to the failed compute node or SDN gateway, and that traffic will be dropped, an issue referred to as "blackholing."

SUMMARY

In general, this disclosure describes techniques for decreasing disruption to traffic flow within Software Defined Networking (SDN) platforms when communication is lost between an SDN controller and devices of an underlay network. The underlay network is made up of physical devices and connections over which an overlay network provides network virtualization. The underlay network may be made up of physical nodes including one or more gateway routers (also referred to herein as SDN gateways), compute nodes, and leaf switches and spine switches of a switch-based Internet Protocol (IP) fabric (also referred to herein as a data center switch fabric) that communicatively couples the compute nodes and the SDN controller. Compute nodes may be servers that execute virtual routers implementing a distributed forwarding plane for one or more virtual networks. The SDN controller and the virtual router of the compute node communicate to share information to control forwarding of tenant traffic within the virtual networks to reach network destinations.

In accordance with the techniques of this disclosure, nodes of the IP fabric are configured to propagate compute node routes to the SDN controller. The SDN controller maintains an overlay routing table that stores overlay network routes (e.g., VPN routes) that are advertised to the SDN controller directly by virtual routers of the compute nodes and/or gateways routers of the data center. The SDN controller also maintains an underlay routing table that stores underlay network routes obtained by the SDN controller as it synchronizes underlay network routing state with the IP fabric by exchanging routing protocol messages with nodes of the IP fabric. The SDN controller performs next hop reachability checks based on the synchronized underlay network routing state before forwarding network traffic using overlay network routes received directly from the compute nodes. In this way, the presence or absence of an underlay network route is a trigger for controlling the distribution or withdrawal of overlay network routes in the overlay network.

This disclosure describes techniques for leveraging a routing protocol to propagate a static underlay network route for reaching the compute node (e.g., a node locator prefix of the compute node, such as an IPv4 or IPv6 prefix of the compute node) from a leaf node (e.g., top-of-rack switch) of the switch fabric. The nodes of the IP fabric distribute the static underlay network route for the compute node, using the network protocol, to the SDN controller. The SDN controller then associates the existence of the static, underlay route to the compute node with "reachability" or "liveness" of the compute node, and is configured to perform a next hop reachability check by first checking whether a route exists in stored routing information before forwarding network traffic to an overlay route associated with the compute node. In this manner, the presence of underlay network routes at the SDN controller are triggers for the SDN controller distributing overlay network routes to peers in the overlay network.

As described in this disclosure, leaf nodes in the IP fabric are configured to run a fault detection protocol session, such as a Bidirectional Forwarding Detection (BFD), between a forwarding plane of each of the leaf nodes and a virtual router of a respective compute node. In this manner, the leaf nodes in the IP fabric can quickly detect when communication with a compute node via the leaf node of the underlay network has failed. In some examples, the BFD session is associated with a Border Gateway Protocol session between the leaf node and the virtual router of the compute node. If the fault detection protocol session of the leaf node detects that communication to the virtual router of the compute node has failed, the leaf node communicates the failure of the underlay network by sending a routing protocol message to a spine node in the IP fabric, withdrawing the underlay network route associated with the compute node. The spine node in turn communicates the underlay network route withdrawal to the SDN controller, and the SDN controller updates its underlay network routing table to withdraw the underlay network route for the unreachable virtual router or compute node. The SDN controller then sends messages to other compute nodes, SDN gateways, or other devices to withdraw the static, underlay routes associated with the failed underlay communication for the compute node.

In this way, the SDN controller is configured to tie advertisement of the overlay network routes (VPN routes) to the presence or absence of the static, underlay network route. The SDN controller only advertises an overlay network route, for a given virtual router, to the other virtual routers of the overlay if the static underlay network route exists. By triggering and controlling the withdrawal of the underlay network route via BFD, the SDN controller controls the advertisement of the overlay routes, which otherwise cannot be tied to liveliness detection by BFD.

In this manner, the techniques of this disclosure may improve the availability of SDN-based services. The techniques of this disclosure may provide one or more advantages. For example, the techniques of this disclosure may provide better integration of the compute nodes with the IP fabric. This approach considers various elements of a virtualized infrastructure: the network virtualization solution (including the SDN controller and virtual routers/virtual agents on compute nodes), the underlay switching layer (e.g., switch-based IP Fabric), as well as the SDN Gateway (e.g. routers). In some aspects, the disclosure provides an approach for integration between the overlay network and the IP fabric, and addresses certain complexities that arise with this approach.

For example, the techniques may avoid traffic blackholing and provide better routing consistency, by more quickly converging the forwarding state with the actual state of the network topology. In some aspects, using micro BFD on all member links of a link aggregation group can help provide faster failure detection. The techniques may provide for good stability of the SDN controller control plane, because only the data plane is checked, in the form of next hop reachability checks to confirm tunnel endpoint liveness. The techniques may also avoid a false positive situation due to underlay failure, which could potentially lead to a double failure in the overlay network (e.g., primary and backup down at the same time).

In one example aspect, a method includes storing, by a Software Defined Networking (SDN) controller, an underlay routing table having a set of routes for an underlay network of a data center and an overlay routing table having a set of routes for at least one virtual network of an overlay network for the data center, wherein the underlay network includes a plurality of physical network switches, gateway routers, and a set of virtual routers executing on respective compute nodes of the data center; installing, within the underlay routing table of the SDN controller, a route to a destination address assigned to a particular one of the virtual routers as an indicator of a reachability status to the particular virtual router in the underlay network; and controlling, with the SDN controller and based on the presence or absence of the route within the underlay routing table to the particular one of the virtual routers, advertisement of one or more of the routes for the at least one virtual network of the overlay network.

In a further example aspect, an SDN controller includes processing circuitry in communication with a memory, the processing circuitry being configured to: store an underlay routing table having a set of routes for an underlay network of a data center and an overlay routing table having a set of routes for at least one virtual network of an overlay network for the data center, wherein the underlay network includes a plurality of physical network switches, gateway routers, and a set of virtual routers executing on respective compute nodes of the data center; install, within the underlay routing table of the SDN controller, a route to a destination address assigned to a particular one of the virtual routers as an indicator of a reachability status to the particular virtual router in the underlay network; and control, based on the presence or absence of the route within the underlay routing table to the particular one of the virtual routers, advertisement of one or more of the routes for the at least one virtual network of the overlay network.

In another example, a method includes installing, within a routing table of a leaf switch of an Internet Protocol (IP) fabric of an underlay network of a data center, an underlay network route to a destination address assigned to a virtual router executing on a compute node, wherein the underlay route provides an indicator of a reachability status to the particular virtual router; and determining, by the leaf switch and via a fault detection protocol session established between the leaf switch and the virtual router, that the virtual router is not responding on the fault detection protocol session; and in response to determining that the virtual router is not responding on the fault detection protocol session, sending, by the leaf switch and toward a spine node that peers with an SDN controller that manages an overlay network, a route withdrawal message withdrawing the underlay network route associated with the virtual router to indicate communication failure with the virtual router.

The details of one or more examples are set forth in the accompanying drawings and the description below. Other features, objects, and advantages will be apparent from the description and drawings, and from the claims.

DETAILED DESCRIPTION

Figure 1:
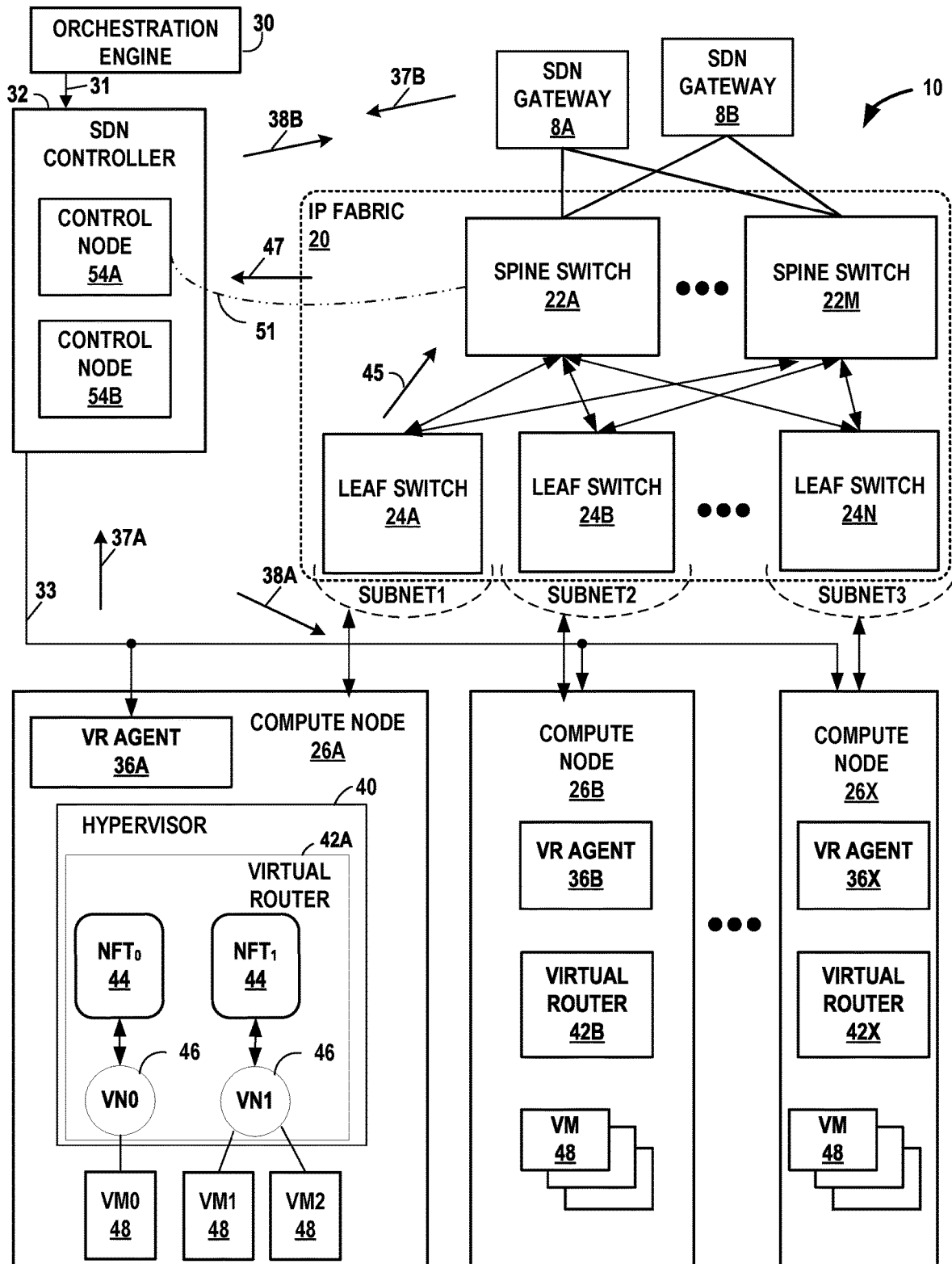
FIG. 1 is a block diagram illustrating an example network system having a data center in which examples of the techniques described herein may be implemented.

FIG. 1 is a block diagram illustrating an example network system 5 having a data center 10 in which examples of the techniques described herein may be implemented. In network system 5, SDN controller 32, compute nodes 26A-26X ("compute nodes 26"), SDN gateways 8A-8B ("SDN gateways 8"), and nodes of Internet Protocol (IP) fabric 20 operate in accordance with the techniques described herein to ensuring customer traffic flow and customer applications executing within the cloud data center continue without interruption.

In general, data center 10 provides an operating environment for applications and services for customers 4 coupled to the data center 10 by service provider network 6. Customers 4 are coupled to service provider network 6 by provider edge (PE) device 12. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via an IP fabric 20 provided by one or more tiers of physical network switches and routers. Compute nodes 26 are servers that function as compute nodes of the data center. In some examples, the terms "compute nodes" and "servers" are used interchangeably herein to refer to compute nodes 26. For example, each of compute nodes 26 may provide an operating environment for execution of one or more customer-specific virtual machines ("VMs" in FIG. 1). IP fabric 20 is provided by a set of interconnected leaf switches 24A-24N (collectively, "leaf switches 24") coupled to a distribution layer of spine switches 22A-22M (collectively, "spine switches 22"). Leaf switches 24 may also be referred to as top-of-rack (TOR) switches. Spine switches 22 may also be referred to as spine switches. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, leaf switches 24 and spine switches 22 provide compute nodes 26 with redundant (multi-homed) connectivity to IP fabric 20. Spine switches 22 aggregate traffic flows and provides high-speed connectivity between leaf switches 24. Leaf switches 24 are network devices that provide layer two (e.g., MAC) and/or layer 3 (e.g., IP) routing and/or switching functionality. Leaf switches 24 and spine switches 22 each include one or more processors and a memory, and that are capable of executing one or more software processes. SDN gateways 8, also referred to as gateway routers, are routing devices that perform layer 3 routing to route network traffic between data center 10 and customers 4 by service provider network 6. SDN gateways 8 provide redundant gateways to forward and receive packets between IP fabric 20 and service provider network 6.

SDN controller 32 provides a logically, and in some cases physically, centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32 operates in response to configuration input received from orchestration engine 30 via northbound Application Programming Interface (API) 31, which in turn operates in response to configuration input received from administrator 28. Additional information regarding SDN controller 32 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32 manages the network and networking services such load balancing, security, and allocate resources from compute nodes 26 to various applications via southbound API 33. That is, southbound API 33 represents a set of communication protocols utilized by SDN controller 32 to make the actual state of the network equal to the desired state as specified by orchestration engine 30. One such communication protocol may include a messaging protocol such as XMPP, for example. For example, SDN controller 32 implements high-level requests from orchestration engine 30 by configuring physical switches, e.g. Leaf switches 24, spine switches 22, physical routers; physical service nodes such as firewalls and load balancers; and virtual services such as virtual firewalls in a VM. SDN controller 32 maintains routing, networking, and configuration information within a state database. SDN controller 32 communicates a suitable subset of the routing information and configuration information from the state database to virtual router (VR) agents 36A-36X ("VA" in FIG. 1) on each of compute nodes 26A-26X.

Typically, the traffic between any two network devices, such as between network devices within IP fabric 20 or between compute nodes 26 and customers 4 or between compute nodes 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of compute nodes 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of compute node 26A, for instance, from the underlying physical network fabric may include an outer header to allow the physical network fabric to tunnel the payload or "inner packet" to a physical network address for a network interface of compute node 26 that executes the virtual router. The outer header may include not only the physical network address of the network interface of the server but also a virtual network identifier such as a Virtual Extensible LAN (VXLAN) tag or Multiprotocol Label Switching (MPLS) label that identifies one of the virtual networks as well as the corresponding routing instance executed by the virtual router or an interface. That is, the MPLS label can map either to a routing instance or to an interface. An inner packet includes an inner header having a destination network address that conform to the virtual network addressing space for the virtual network identified by the virtual network identifier. In some aspects, the virtual router buffers and aggregates multiple tunneled packets received from the underlying physical network fabric prior to delivery to the appropriate routing instance for the packets.

In the example of FIG. 1, SDN controller 32 learns and distributes routing and other information (such as configuration information) to all compute nodes in the data center 10. The VR agent 36 running inside the compute node, upon receiving the routing information from SDN controller 32, typically programs the data forwarding element (virtual router) with the forwarding information. SDN controller 32 sends routing and configuration information to the VR agent 36 using a messaging protocol such as XMPP protocol. In XMPP, SDN controllers 32 and agents communicate routes and configuration over the same channel. SDN controller 32 acts as a messaging protocol client when receiving overlay network routes (virtual routes) from a VR agent 36, and the VR agent 36 acts as a messaging protocol server in that case. Conversely, SDN controller 32 acts as a messaging protocol server to the VR agent 36 as the messaging protocol client when the SDN controller sends routes to the VR agent 36, including overlay network routes learned from SDN gateways or other compute nodes, and underlay network routes for other compute nodes learned from IP fabric.

The software defined networking approach illustrated in FIG. 1 provides network virtualization at the compute node level, by virtue of overlay networking. However, the SDN performance needs to meet highly demanding WAN service level agreements (SLAs) of service providers. For example, some SLA requirements may require the network to reach sub-second convergence (0.5 seconds downtime) in SDN integrations between SDN controller, IP fabric, and SDN controller, for any failure use case. In a network, network devices must maintain routing information and forwarding information that accurately reflects how to send traffic to destinations, based on a current network topology. Convergence is the process of devices in the network updating their routing information and forwarding information to be accurate after a change to the network topology. Some scenarios may be more challenging to meet convergence time requirements due to lacking features, design limitations of other compute OS/OSS/Kernel dependencies, or product limitations, such as slow control plane, FIB writing speeds on low end switches, for example.

Convergence may involve three stages: detection, local repair, and global repair. In detection, a node detects that a failure has occurred. In the example of FIG. 1, a failure may occur to a virtual machine, a physical network function (PNF), or in the IP fabric, as a few examples. Only after detection can corrective actions can be enforced, such as by programming a new forwarding path routing update. Detection takes time in a virtual environment. Unlike in a physical environment, where link down events can be associated with a detection, virtual environments may rely on keepalive mechanisms to detect failures. When dealing with fast convergence, "detection time" must be bounded.

Local repair may also be referred to as fast reroute (FRR) or fast convergence. Right after the detection of a failure, the local system can divert traffic to an alternative path if available (i.e., a backup that has been previously signaled). At this point, other systems have not taken any corrective actions and may simply not be aware of the topological change.

Global repair, which may also be referred to as network convergence, happens after all systems in the network are notified of the topological and have enforced corrective actions (when appropriate), the signaling of the topological changes being ideally propagated by routing protocols. After global repair, the network is in a steady state with a consistent routing information in the control plane and forwarding information programmed into data forwarding paths. The availability of services is bound to timers, network capabilities and design. From the perspective of service availability, local convergence can be enough, as long as an alternative forwarding path has been provided by the network. This is a typical situation in data center architecture, where Equal Cost Multi-Path (ECMP) or bond offer native redundant paths.

The physical nodes and physical connections of the software-defined network are referred to as an underlay network, while the virtual nodes and elements that logically connects the virtual nodes of the software-defined network to form are referred to as an overlay network. In virtualized environments such as in network system 5 of FIG. 1, different types of failure may occur in the underlay network. The underlay network may be made up of physical nodes including SDN gateways 8, leaf switches 24 and spine switches 22 of IP fabric 20, compute nodes 26, and the physical connections (e.g., links) between these elements. In the example of FIG. 1, there may be several points of failure in the underlay network: gateway failure, gateway-to-spine link failure, spine failure, spine-to-leaf link failure, leaf failure, leaf-to-compute node link failure, compute link failure, compute node failure, and bare metal server (BMS) failure. There may also be failures in the overlay network (e.g., workload failures such as virtual machine failure or pod failure), but these can typically be detected and addressed in a sub-second timeframe, so may be less of an issue than some underlay network failure types.

Gateway failure is described as follows. Each of SDN gateways 8 peer via Multi-Protocol Border Gateway Protocol (MP-BGP) with control nodes of SDN controller 32. Network system 5 includes two SDN gateways for high availability. When an Option B inter-Autonomous System (AS) framework is implemented, each of SDN gateways 8 appears as: a Tunnel Endpoint (MPLS over UDP, MPLS over GRE or VXLAN) from the perspective of virtual routers for all prefixes originated beyond or from gateway. Each of SDN gateways 8 also appears as an egress PE (next hop) from the perspective of a remote PE device 12. Although described in terms of MPLS over UDP, in some examples segment routing MPLS (SR-MPLS), MPLS over MPLS, or SRv6 may be used for the overlay network.

In the absence of the techniques of this disclosure, in case of a failure of one of SDN gateways 8, the Control Node of SDN controller 32 requires a BGP hold-time timer expiration to detect the failure and generate routing updates to the compute nodes (virtual router). Meanwhile, traffic from the compute nodes to the backbone will be subject to ECMP load balancing to both SDN gateways 8. Therefore, the convergence time for this failure case would be equal to the BGP hold-time (which by default is ninety seconds).

A dependency on the BGP holdtime for convergence may not be acceptable in a service provider environment. This timer can technically be decreased to 3 seconds, however this is not a recommended configuration. As described in further details below, the techniques of this disclosure employ a fault detection protocol for fast peering failure detection. The fault detection protocol may be, for example, Birectional Forwarding Detection (BFD) protocol. BFD protocol is a simple hello mechanism that detects failures in a network. Hello packets are sent between the forwarding planes of two network devices at a specified, regular interval. A neighbor failure is detected when the routing device stops receiving a reply after a specified interval. The failure detection timers for BFD have shorter time limits than default failure detection mechanisms for BGP, so they provide faster detection. Further details of the BFD protocol are described in D. Katz, et al., "Bidirectional Forwarding Detection (BFD)," IETF RFC 5880, June 2010, the entire contents of which are incorporated by reference herein. Although described for purposes of example in terms of using BFD as the fault detection protocol, in other examples, a different fault detection protocol may be used, such as seamless BFD (S-BFD), for example.

Another example of underlay network failure is failure of a compute node 26. "Compute node failure," as described herein, may include failure of the virtual router, including in situations where the virtual router fails but the compute node itself remains operational in some respects. In the absence of the techniques of this disclosure, there is a long delay in the SDN controller 32 detecting failure of the virtual router, due to the slow detection by SDN controller 32 of the compute node/virtual router failure (based on XMPP holdtime, the time in which SDN controller 32 does not receive any messages over an XMPP session with the virtual router).

In the case of a compute node 26 failure, in the absence of the techniques of this disclosure, the following sequence may apply: (1) First, expiration of the compute XMPP holdtime: e.g., 3*5=15 seconds; (2) next, SDN controller 32 updates its routing tables (VPNv4, EVPN) with deletion; (3) next, SDN controller 32 propagates deletion of all address reachable via the failed compute node 26 (by sending mp_unreach/withdraw message) to SDN Gateways 8 (via MP-BGP) and compute nodes involved in the same VNs (via XMPP). Next, SDN Gateways 8 and compute nodes 26 update their forwarding information. Without any specific feature (e.g., multipath/PIC-EDGE), this operation can take significant time in high scale scenarios, as linear time dependencies applies (a router may have roughly 2-5K prefixes per second and virtual router has around 10K prefixes per second).

There are other underlay failure scenarios, which may have shorter detection times and are therefore less problematic. Examples include failure of a link between a SDN gateway 8 and a spine switch 22, failure of a spine switch 22, failure of a link between a spine switch 22, and a leaf switch 24, failure of a leaf switch 24, and failure of a link between a leaf switch 24 and a compute node 26.

This disclosure also describes techniques for leveraging a routing protocol to propagate an underlay network route for the compute node (e.g., a prefix such as a /32 IPv4 address, /128 IPv6 address, or supernet), through physical nodes of an IP fabric 20 that physically couples the compute node server to server devices executing compute nodes of the SDN controller 32. The physical infrastructure of the IP fabric communicates the underlay route for the compute node to the SDN controller. The SDN controller then associates the existence of an underlay route to the compute node with "reachability" or "liveness" of the compute node, and is configured to perform a next hop reachability check by first checking whether an underlay route exists in stored routing information before forwarding network traffic to an overlay route associated with a compute node. If a compute node fails, this failure is detected by the IP fabric node (e.g., using BFD) and communicated to the SDN controller via the IP fabric nodes, and the SDN controller then sends messages to other compute nodes, SDN gateways, or other devices to withdraw overlay routes associated with the failed compute node. In this way, the routes in the overlay network are tied to BFD in the underlay, effectively using the "static" underlay route as a flag for controlling whether to advertise or withdraw the VPN routes to the overlay network devices.

In accordance with the techniques of this disclosure, nodes of IP fabric 20 are configured to distribute compute node routes, including communicating the routes to SDN controller 32. In addition, nodes of IP fabric 20 distribute routes for SDN gateways 8 to SDN controller 32. For example, IP fabric 20 propagates the IP address of the virtual router compute node and SDN Gateway Loopback addresses via BGP to Control Nodes. The Local Leaf switch generates a prefix route entry for the virtual router vhost IP address (i.e., Tunnel Endpoint). The liveness of the compute node can be first based on network interface card (NIC) Link state and furtherly optimized with micro BFD session toward the virtual router in a second step for better health tracking.

SDN controller 32 maintains a routing table and synchronizes routing state with the IGP of IP fabric (which may be for example eBGP here), and SDN controller 32 performs next hop reachability checks. A Next-Hop reachability check enforced at Control Nodes of SDN controller 32 and SDN Gateways 8 based on the existence of the Compute IP address prefix (e.g., /32 for IPv4). For example, SDN controller 32 may be configured with policies to control what a proper next hop is. In some examples, the next hop reachability checks may only be enforced on /32 routes, i.e., host routes to a unique device. If the /32 Next-Hop route is not present for a tunnel endpoint, then all dependent prefixes for the /32 next hop are marked as down and withdrawn from the virtual router forwarding planes. This principle can also apply to any VXLAN tunnel endpoints (VTEPs) in case of BMS integration. In this manner, the presence of underlay network routes at the SDN controller are triggers for the SDN controller distributing overlay network routes to peers in the overlay network.

For example, SDN controller 32 stores an underlay routing table having a set of routes for an underlay network of data center 10 and an overlay routing table having a set of routes for at least one virtual network of an overlay network for the data center, wherein the underlay network includes a plurality of physical network switches of IP fabric 20, gateway routers such as SDN gateways 8, and a set of virtual routers executing on respective compute nodes 26 of the data center 10. The techniques include installing, within the underlay routing table of the SDN controller 32, a route to a destination address assigned to a particular one of the virtual routers as an indicator of a reachability status to the particular virtual router in the underlay network; and controlling, with the SDN controller 32 and based on the presence or absence of the route within the underlay routing table to the particular one of the virtual routers, advertisement of one or more of the routes for the at least one virtual network of the overlay network.

The techniques of this disclosure may provide better integration of the virtual router in the underlay network, with the IP Fabric 20. As fast convergence is a critical issue in virtualized environments for the reasons discussed above, a phased approach may be used to meet short term objectives.

In this way, SDN controller 32, compute nodes 26, SDN gateways 8, and nodes of IP fabric 20 are configured in a manner that enables the cloud networking to continue operating, even when an SDN gateway 8 or compute node 26 go down. Therefore, data center 10 ensures customer traffic flow and customer applications executing within the cloud data center continue without interruption when one of compute nodes 26 or SDN gateways 8 goes down.

Figure 2:
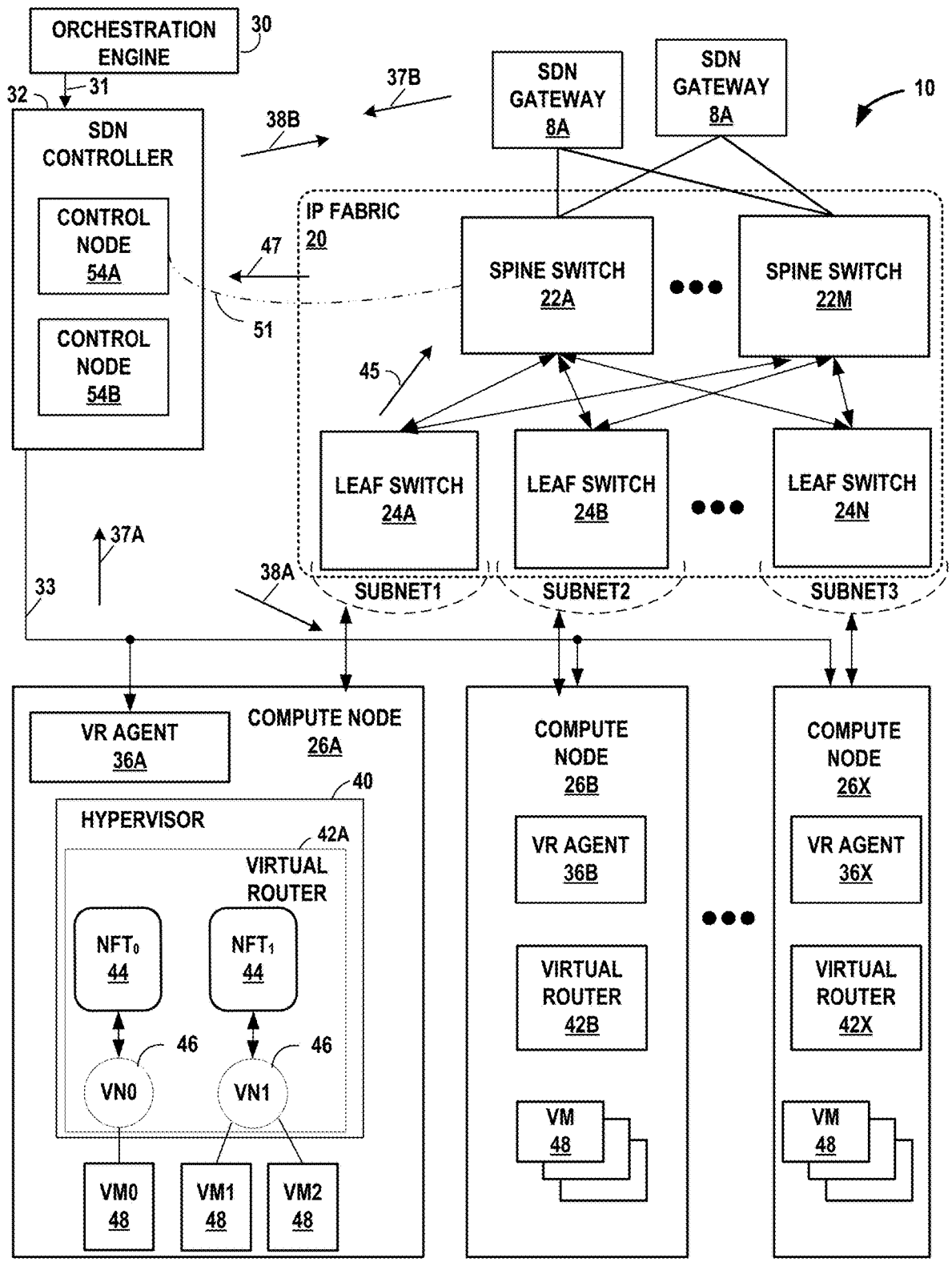
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes compute nodes 26A-26X that include virtual routers 42A-42X (collectively, "virtual routers 42," sometimes referred to as "vrouter"). Responsive to instructions received from SDN controller 32, virtual routers 42 dynamically create and manage one or more virtual networks ("VN1, VN0") 46 usable for communication between application instances.

In one example, virtual routers 42 execute the virtual network as an overlay network, which provides the capability to decouple an application's virtual address from a physical address (e.g., IP address) of the one of compute nodes 26A-26X ("compute nodes 26") on which the application is executing. Each virtual network may use its own addressing and security scheme and may be viewed as orthogonal from the physical network and its addressing scheme. Various techniques may be used to transport packets within and across virtual networks 46 over the physical network.

Each of virtual routers 42 executes within a hypervisor, a host operating system, or other component of each of compute nodes 26. Each of compute nodes 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of compute nodes 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks VN0-VN1 and represents tenant VMs running customer applications such as Web servers, database servers, enterprise applications, or hosting virtualized services used to create service chains. In some cases, any one or more of compute nodes 26 or another computing device hosts customer applications directly, i.e., not as virtual machines. Virtual machines as referenced herein, e.g., VMs 48, compute nodes 26, or a separate computing device that hosts a customer application may be referred to alternatively as "hosts."

In general, each of VMs 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications, but is unaware of an IP address of the physical compute node 26A on which the virtual machine is executing. In this way, a "virtual address" is an address for an application that differs from the logical address for the underlying, physical computer system, e.g., compute node 26A in the example of FIG. 2. The virtual addresses may also be referred to herein as "virtual interfaces."

In one implementation, each of compute nodes 26 includes a corresponding one of VR agents 36A-36X that communicates with SDN controller 32 and, responsive thereto, directs virtual router 42 so as to control the overlay of virtual networks 46 and coordinate the routing of data packets within compute node 26. In general, each VR agent 36 communicates with SDN controller 32, which generates commands to control routing of packets through data center 10.

VR agents 36 execute in user space and operate as a proxy for control plane messages between VMs 48 and SDN controller 32. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each compute node 26A further includes an orchestration agent (not shown in FIG. 2) that communicates directly with orchestration engine 30. For example, responsive to instructions from orchestration engine 30, the orchestration agent communicates attributes of the particular VMs 48 executing on the respective compute node 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of compute nodes 26. As another example, encapsulation and decapsulation functions are performed at the edge of IP fabric 20 at a first-hop top-of-rack (TOR) switch 24 that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, SDN controller 32 provides a logically centralized controller for facilitating operation of one or more virtual networks within data center 10. For example, SDN controller 32 maintains a routing information base, e.g., one or more routing tables that store routing information for the physical network as well as one or more overlay networks of data center 10. The routing information base may include overlay network routing information and underlay network routing information, as described herein. Similarly, spine switches 22, leaf switches 24 and virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack. In addition, virtual router 42A maintains underlay routing information storing underlay routes associated with other ones of compute nodes 26 or SDN gateways 8, learned from SDN controller 32. In accordance with the techniques of this disclosure, network forwarding table 44 may also store forwarding information associated with the underlay routes.

For example, virtual machine VM1-48 may send an "inner packet," to virtual router 42A by an internal link. Virtual router 42A uses $NFT_1$ to look up a virtual network destination network address for the packet. $NFT_1$ specifies an outbound interface for virtual router 42A and encapsulation for the packet. Virtual router 30A applies the encapsulation to add a tunnel header to generate an outer packet and outputs the outer packet on the outbound interface, in this case toward leaf switch 24A.

The routing information, for example, maps packet key information (e.g., destination IP information and other select information from packet headers) to one or more specific next hops within the networks provided by virtual routers 42 and IP fabric 20. In some cases, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through IP fabric 20. In this way, network packets associated with any of virtual machines 48 may be transported as encapsulated packet communications via the overlay network.

Each of VR agents 36 may send messages to SDN controller 32 over XMPP sessions, the messages conveying virtual routes to the virtual interfaces (virtual addresses) of the VMs of compute nodes 26. The virtual routes are referred to herein as overlay network routes. For example, VR agent 36A sends an XMPP message 37A containing overlay network routes for compute node 26A. SDN gateways 8 may also send messages to SDN controller 32, e.g., via BGP sessions, containing overlay network routes for SDN gateways. This may include overlay routes from the "non-SDN" perimeter, such as SDN gateways 8 sending to SDN controller 32 customer 4 routes received via SP network 6. For example, SDN gateway 8A sends an overlay network route 37B to SDN controller 32. SDN controller 32 receives the messages and stores the virtual routes to overlay routing information, and may in turn advertise one or more of the overlay routes received from a first VR agent 36 to other VR agents 36 (via XMPP) and to SDN gateways 8 (e.g., via BGP), such as via messages 38A, 38B, respectively. In some examples, any of the overlay routes may include a prefix, a next hop address associated with a server of compute nodes 26, and a label or other data to identify a virtual routing and forwarding instance configured at the next hop server. A virtual route may include a Route Distinguisher (RD). Further details of BGP-signaled IP/VPNs are described in S. Mackie, BGP-signaled end-system IP/VPNs, Network Working Group Internet-Draft, Dec. 15, 2016, the entire contents of which are incorporated by reference herein.

However, when one of compute nodes 26 fails or otherwise becomes unreachable, it takes time for SDN controller 32 to learn this information and in turn advertise withdrawal of the overlay network route for the failed compute node to other compute nodes 26 and SDN gateways 8. The techniques of this disclosure provide a mechanism for SDN controller 32 to more quickly become aware of the failure by learning it from devices in the IP fabric 20, based on underlay network routes. This disclosure also provides techniques for local repair of forwarding information after being informed of a withdrawal of underlay network route. These aspects may be used together in some examples, or independently.

In accordance with the techniques of the disclosure, each of leaf switches 24 may be configured to generate and send BGP messages to spine switches 22 that advertise underlay network routes to compute nodes. For example, leaf switch 24A sends a routing protocol message 45 to spine switch 22A advertising the underlay network route to compute node 26A. Leaf switch 24A may generate the routing protocol message 45 upon detecting ARP activity of compute node 26A. The underlay network route to compute node 26A may include the prefix associated with the server of compute node 26A.

In some examples, compute node 26A may itself execute a routing protocol process and run a BGP session to leaf switch 24A as a BGP peer, and compute node 26A may send a BGP message to leaf switch 24A advertising loopback address of compute node 26A, which in turn triggers leaf switch to generate the routing protocol message 45 to spine switch 22A. The routing protocol used to convey messages within IP fabric 20 and between the compute node and the IP fabric may be BGP, BGP with extensions, a Routing in Fat Trees (RIFT) protocol, ISIS, OSPF, or other routing protocol (including, for example, a proprietary routing protocol). Further details on this approach are discussed in FIG. 17.

The underlay network route to compute node 26A is propagated up through IP fabric 20 (which may include additional levels not shown in FIG. 2), until spine switch 22A sends a routing protocol message 47 advertising the underlay network route to control node 54A of SDN controller 32, over BGP session 51 between spine switch 22A and control node 54A. Although shown for purposes of example with only a single BGP session 51 to control node 54A, in some examples, spine switch 22A may also have a BGP session with control node 54A, and similarly other spine switches 22 may have corresponding BGP sessions with one or more control nodes.

SDN controller 32 sends XMPP messages to compute nodes 26B-26X advertising the learned underlay route to compute node 26A. SDN controller 32 sends BGP messages to SDN gateways 8 advertising the learned underlay routes. Similarly, SDN controller 32 may send messages to compute nodes and other SDN gateways advertising underlay routes to SDN gateways 8 that were learned via IP fabric 20. SDN controller 32 and SDN gateways 8 perform next hop reachability checks for /32 routes (or /128 IPv6 address, or supernet), as described herein, such that they are only advertising overlay network routes having corresponding underlay network routes learned via the IP fabric 20.

In response to detecting failure of a compute node such as compute node 26A, e.g., via a BFD session, leaf switch 24A propagates the underlay network route withdrawal up the IP fabric 20 to SDN controller 32, and from SDN controller 32 to compute nodes 26B-26X and SDN gateways 8. For example, the leaf switch determines via a fault detection protocol session established between the leaf switch and a virtual router executing on a compute node, that the compute node is not responding on the fault detection protocol session, and in response to determining that the compute node is not responding on the fault detection protocol session, the leaf switch sends to the spine node a route withdrawal message withdrawing an underlay network route associated with the compute node.

In turn, the compute nodes 26B-26X and SDN gateways 8 update their forwarding planes to remove the next hop of compute node 26A. In some examples, updating the forwarding planes may include local repair techniques using an orthogonal liveness vector and prefix-independent convergence, as described in further detail below.

In this manner, according to the techniques of the present disclosure, SDN controller 32 is configured to determine whether an overlay network route is reachable based on whether a corresponding underlay route has been advertised or withdrawn by the IP fabric 20, therefore potentially decreasing service downtime and interruptions to its customers by forwarding traffic only to reachable next hops.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3:
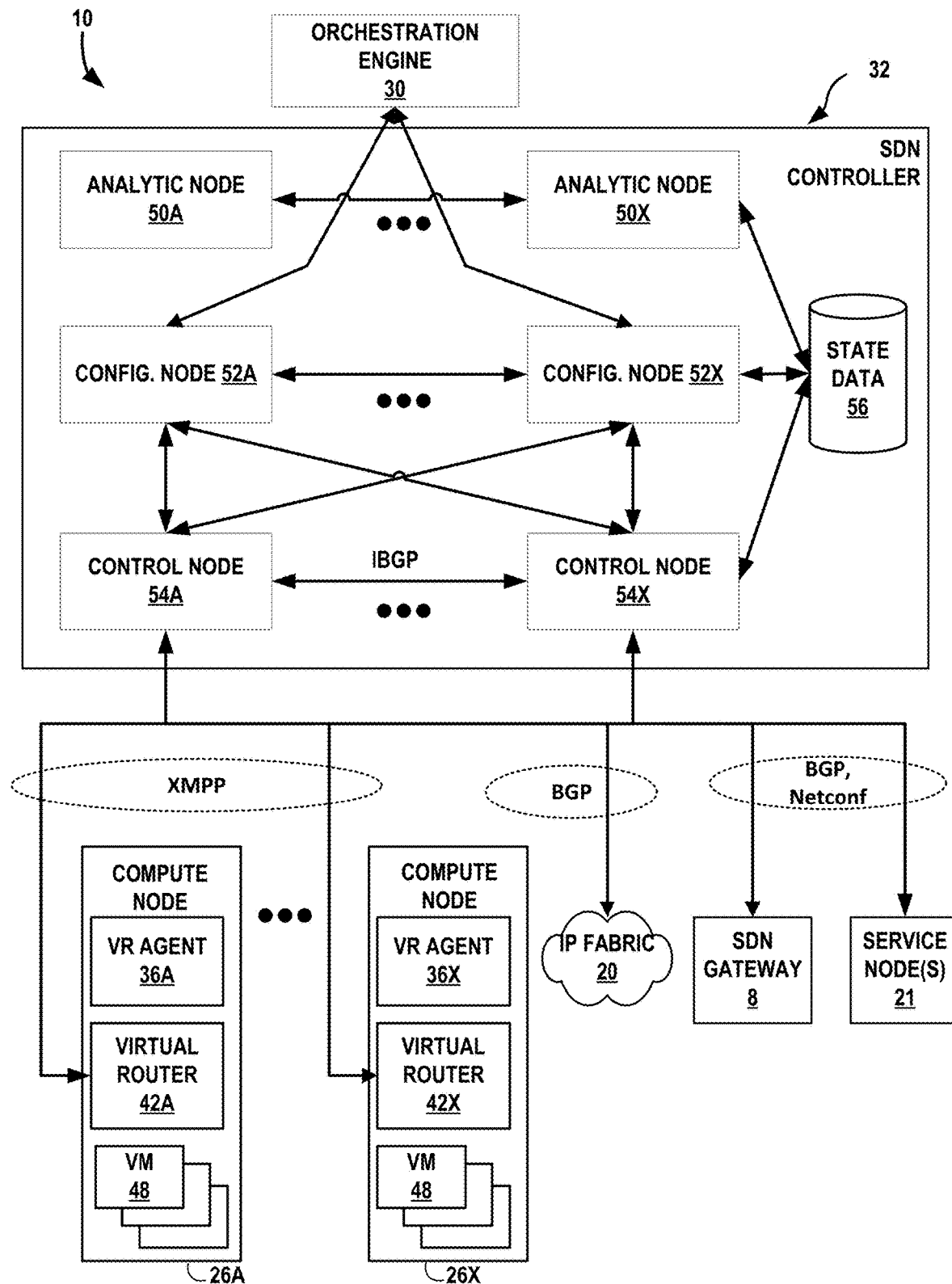
FIG. 3 is a block diagram illustrating an example implementation of the data center of FIG. 2 in further detail.

FIG. 3 is a block diagram illustrating an example implementation of the data center of FIG. 2 in further detail. In the example of FIG. 3, SDN controller 32 includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the nodes 50, 52, and 52 may be implemented as a separate software process, and the nodes may be distributed across multiple hardware computing platforms that provide an environment for execution of the software. Moreover, each of the nodes maintains state database 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower level models suitable for interacting with network elements, such as physical switches 22, 24 and VR agents 36. Configuration nodes 52 keep a persistent copy of the configuration state of SDN controller 32 within state database 56 ("STATE DATA 56").

Control nodes 54 implement a logically centralized control plane responsible for maintaining ephemeral network state. Control nodes 54 interact with each other and with network elements, such as VR agents 36 and virtual routers 42 of compute nodes 26, to ensure that the network state is eventually consistent with desired state as specified by orchestration engine 30. In general, control nodes 54 receive configuration state information of SDN controller 32 from configuration nodes 52, and exchange routes with each other via IBGP to ensure that all control nodes 54 have the same network state. Further, control nodes 54 exchange routes with VR agents 36 on compute nodes 26 via XMPP. Control nodes 54 also communicate the configuration state information, such as routing instances and forwarding policy, to VR agents 36, e.g., via XMPP, for installation within respective virtual routers 42. In some examples, control nodes 54 may proxy traffic on behalf of compute nodes 26. These proxy requests may be received over XMPP. Further, control nodes 54 exchange routes with SDN gateway 8 via BGP, and exchange the configuration state of SDN controller 32 with service nodes 21 via Netconf.

Configuration nodes 52 provide a discovery service that customers 4 may use to locate various services available within the network. For example, if VR agent 36A attempts a connection with control node 54A, it uses a discovery service provided by configuration nodes 52 to discover the IP address of control node 54A. Clients executing on VMs 48 may use local configuration, DHCP or DNS to locate the service discovery server within configuration nodes 52.

In some examples, configuration nodes 52 present a northbound API that interfaces with orchestration engine 30. Orchestration engine 30 uses this interface to install configuration state using the high-level data model. Configuration nodes 52 further include a message bus to facilitate communications amongst internal components. Configuration nodes 52 further include a transformer that discovers changes in the high-level model of orchestration engine 30 and transforms these changes into corresponding changes in the low-level data model managed by SDN controller 32. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

In accordance with the techniques of this disclosure, the following sequence of events happens in case of SDN gateway failure or compute node failure: Leaf switch detects the Tunnel Endpoints failure (i.e., gateway and vrouters). For SDN Gateways 8 as the Tunnel Endpoint, the reachability of these loopbacks is monitored via BFD/link down for Single Hop eBGP peering between Gateways and IP Fabric (spine devices in this context). For vrouters, BFD link down detection permits detecting the failure of a compute node leaf level. Enhancements are possible using micro BFD. The Tunnel Endpoint IP addresses are propagated to the Control Nodes via MP-BGP.

Hence, if any Tunnel Endpoint fails, the BGP withdrawal information is propagated up to the Control Nodes, which triggers the removal of forwarding entries at vrouter level. There are two options to achieve the removal of forwarding entries at vrouter level. (1) The first option is global repair with fast detection (code change on control node only): Implement the next hop (NH) reachability checks in the Control Node. In case of a Tunnel Endpoint failure, the Control Node will send an update of all prefixes toward all vrouter-agents. This option introduces a linear dependency with respect to the number of prefixes to be updated (vrouter FIB update). In case of high-scale scenario, the sub-second objective will not be met, which is the reason why an enhancement (local repair) is proposed below.

(2) The second option is local repair to get optimal convergence time in high-scale scenario. In this case, the reachability information of all Tunnel Endpoint prefixes is propagated up to the vrouter agent. In case of failure, the Control Node notifies the agent of the loss of the Endpoint (withdraw). New code at vrouter agent permits to immediately update the local FIB by invalidating entries toward broken IP tunnels (local repair). An appropriate indirection in the FIB must be implemented in the vrouter dataplane level to get rid of any linear dependency due to the number of prefixes. This option is discussed in further detail below.

The architecture of data center 10 illustrated in FIG. 3 is shown for purposes of example only. The techniques as set forth in this disclosure may be implemented in the example data center 10 of FIG. 3, as well as other types of data centers not described specifically herein. Nothing in this disclosure should be construed to limit the techniques of this disclosure to the example architecture illustrated by FIG. 3.

Figure 4:
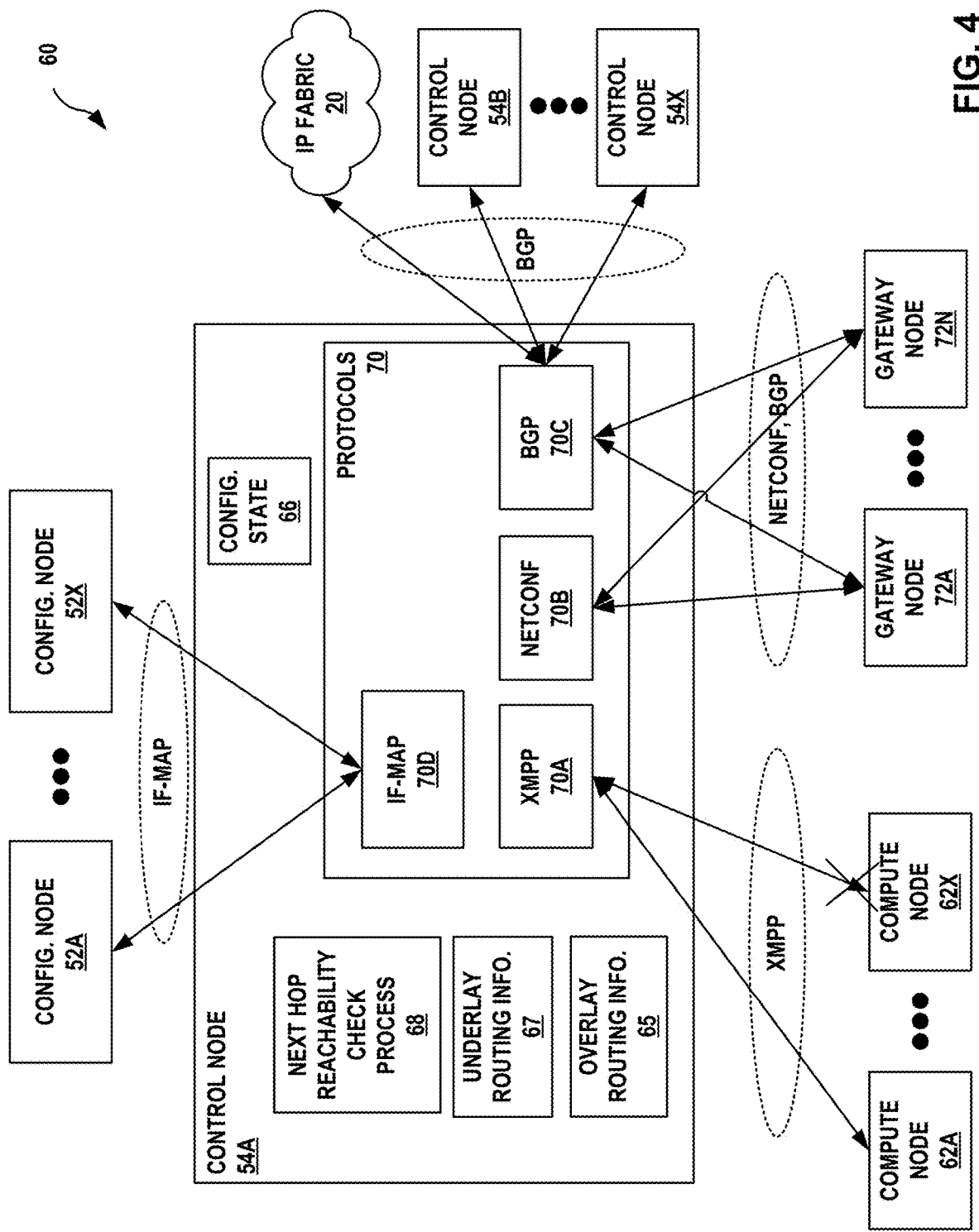
FIG. 4 is a block diagram illustrating an example of a control node of an SDN controller in further detail in accordance with the techniques of this disclosure.

FIG. 4 is a block diagram illustrating an example of a control node of an SDN controller in further detail in accordance with the techniques of this disclosure. Control node 54 is configured to communicate with multiple other types of nodes, including configuration nodes 52A-52X ("config. nodes 52"), other control nodes 54B-54X, compute nodes 62A-62X ("compute nodes 62"), and gateway nodes 72A-72N ("gateway nodes"). Control node 54 also communicates with IP fabric 20, which, as described herein, may be made up of devices including spine switches and leaf switches, for example. Control node 54A provides an operating environment for protocols 70 to execute. Protocols 70 may include, for example, an XMPP process 70A, a NETCONF process 70B, a BGP process 70C, and an IF-MAP process 70D.

The control nodes receive configuration state from the configuration nodes using IF-MAP. The control nodes exchange overlay network routes with other control nodes using IBGP to ensure that all control nodes have the same overlay network state. The control nodes exchange overlay network routes (e.g., VPN routes) with the vRouter agents on the compute nodes using XMPP. The control nodes also use XMPP to send configuration state such as routing instances and forwarding policy. The control nodes proxy certain kinds of traffic on behalf of compute nodes. These proxy requests are also received over XMPP. The control nodes exchange overlay network routes with the gateway nodes (routers and switches) using BGP. The control nodes also send configuration state using NETCONF.

Control node 54A receives configuration information from one or more of config. nodes 52 using Interface to Metadata Access Points (IF-MAP) process 70D. IF-MAP process 70D may include circuitry for executing software instructions for sending and receiving communications from config nodes 52 in accordance with the IF-MAP protocol. IF-MAP process 70D stores the configuration information received from configuration nodes 52 to configuration state 66 ("CONFIG. STATE 66").

Control node 54A exchanges BGP messages with BGP peers, including control nodes 54B-54X and gateway nodes 72 using BGP process 70C. Gateway nodes 72 may include one or more SDN gateways such as SDN gateway 8. BGP process 70C may include circuitry for executing software instructions for sending and receiving BGP messages with control nodes 54B-54X in accordance with the BGP protocol. BGP process 70C stores overlay network routes received from BGP route advertisements from gateway nodes 72 and control nodes 54B-54X to overlay routing information 65. BGP process 70C stores underlay network routes received from BGP route advertisements from IP fabric 20 to underlay routing information 67.

Control node 54A exchanges messages with compute nodes using XMPP process 70A in accordance with XMPP. Control node 54A exchanges the messages via XMPP sessions. Compute nodes 62 may correspond to compute nodes 26 of FIGS. 1-3. XMPP process 70A may include circuitry for executing software instructions for exchanging XMPP messages with compute nodes 62 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein. Control node 54A (and more specifically, XMPP process 70A of control node 54A) may serve as an XMPP client or an XMPP server relative to one of compute nodes 62, depending on the context. For example, control node 54A may act as an XMPP server, and compute nodes 62 may be XMPP clients that subscribe to information published by control node 54A, such as configuration information from configuration state 66 for individual compute nodes 62 and routing information from overlay routing information 65 or underlay routing information 67 that pertains to individual compute nodes 62.

As another example, control node 54A may act as an XMPP client to one or more of compute nodes 62 as XMPP servers, in which control node 54A subscribes to information published by compute nodes 62, such as routing information learned by compute nodes 62 from other sources. XMPP process 70A receives overlay network routes from compute nodes 62A via an XMPP session and stores the overlay network routes to overlay routing information 65. Overlay network routes learned by XMPP process 70A may be leaked to BGP process 70C, and BGP process 70C in turn may send to its BGP peers (e.g., other compute nodes or SDN gateways) BGP routing advertisements that advertise the overlay network routes in overlay routing information 65 learned from compute nodes 62 via XMPP. In some examples, NETCONF process 70B of control node 54A enables control node 54A to communicate with gateway nodes 72 via the NetConf protocol.

In accordance with the techniques of this disclosure, next hop reachability check process 68 performs an additional next hop reachability check on overlay routing information 65, to confirm that there exists a corresponding route for host addresses in underlay routing information 67. In some examples, next hop reachability check process 68 only enforces the next hop reachability check on host addresses in overlay routing information 65. Next hop reachability check process 68 may mark as "reachable" all entries in overlay routing information 65 for which a corresponding host address route entry exists in underlay routing information 67. Alternatively or additionally, next hop reachability check process 68 may mark as "unreachable" all entries in overlay routing information 65 for which a corresponding host address route entry does not exist in underlay routing information 67. This may be indicated by a separate flag in the entries of overlay routing information, for example.

FIG. 4 illustrates a case where compute node 26X has failed. The compute node failure case may be troublesome because there is no native backup path in a standard design. Indeed, for convergence to happen, redundancy must previously be enforced at the service level (i.e., overlay/VNF level), typically using Virtual IP addresses (i.e., a same VIP is reachable via two separate Virtual Machine Interfaces hosted on different physical compute nodes). This can be done in two different ways: (1) Active/Active: ECMP load balancing, in which a same prefix is advertised from different vrouters with identical BGP attributes so as to enforce load balancing; or (2) Single Active: Primary/Backup routing managed via routing preferences, which can be done in many ways via BGP. A Multi-Exit Discriminator (MED) approach may be used; other options such as Local Preferences or autonomous system (AS) path length may also be used.

In parallel, failover can happen in different ways, for example: (1) Gateway with standard Label allocation policy (per Next Hop label): in this case ECMP (or weighted multipath) happens at the level of Remote PE device 12 due to the distinct MPLS datapaths available via Option B. (2) Gateway with per virtual routing and forwarding (VRF) Label allocation policy (vrf-table-label): in this case ECMP (or weighted multipath) happens at the Gateway level because a unique Label is advertised toward the backbone for all prefixes (actually route distinguisher:VIP) of the VRF.

The following section describes several different use cases. Solutions to the different use cases may differ and require specific features either at physical router or in SDN controller 32 to be operational. Active-Active (ECMP) use cases may include: (1) ECMP with standard Option B enforcement at Gateway; (2) ECMP with Option A+B enforcement at Gateway; (3) ECMP at vrouter. From a forwarding perspective, this use case is similar to the gateway failure description (ECMP from vrouter to gateways). Single Active (Primary/Backup) use cases may include: (1) Active/Standby with Option B enforcement at Gateway; (2) Active/Standby with Option A+B; (3) Active/Standby at vrouter enforcement at Gateway. For any of the above Use Cases, a Compute node failure results in similar downtime, which is mostly driven by a slow detection time. Note that in some cases, VNFs may onboard their own failure detection and mitigation framework.

As noted above, BGP process 70C receives underlay network routes via BGP sessions from IP fabric 20, BGP process 70C stores the underlay network routes to underlay routing information 67, and next hop reachability check process may update the corresponding overlay network routes in overlay routing information 65 to add a "reachable" flag to any overlay network routes that now have corresponding routes in underlay routing information 67. XMPP process 70A and BGP process 70C (and/or NETCONF process 70B) then can send the overlay network routes to other peers.

In some examples, in response to learning via a BGP session between control node 54A and IP fabric 20 that compute node 62X has gone down, next hop reachability check process 68 (or, in some examples, BGP process 70C or XMPP process 70A) may mark as unreachable any overlay network routes in overlay routing information 65 that XMPP process 70A learned from compute node 62X. In other examples, next hop reachability check process 68 will delete the overlay network routes from overlay routing information 65, which may trigger XMPP process 70A and BGP process 70C to send route withdrawal messages to compute node 62A and gateway nodes 72. In this manner, control node 54A can more quickly detect failures in the underlay network and inform other network devices of the failure.

Figure 5A:
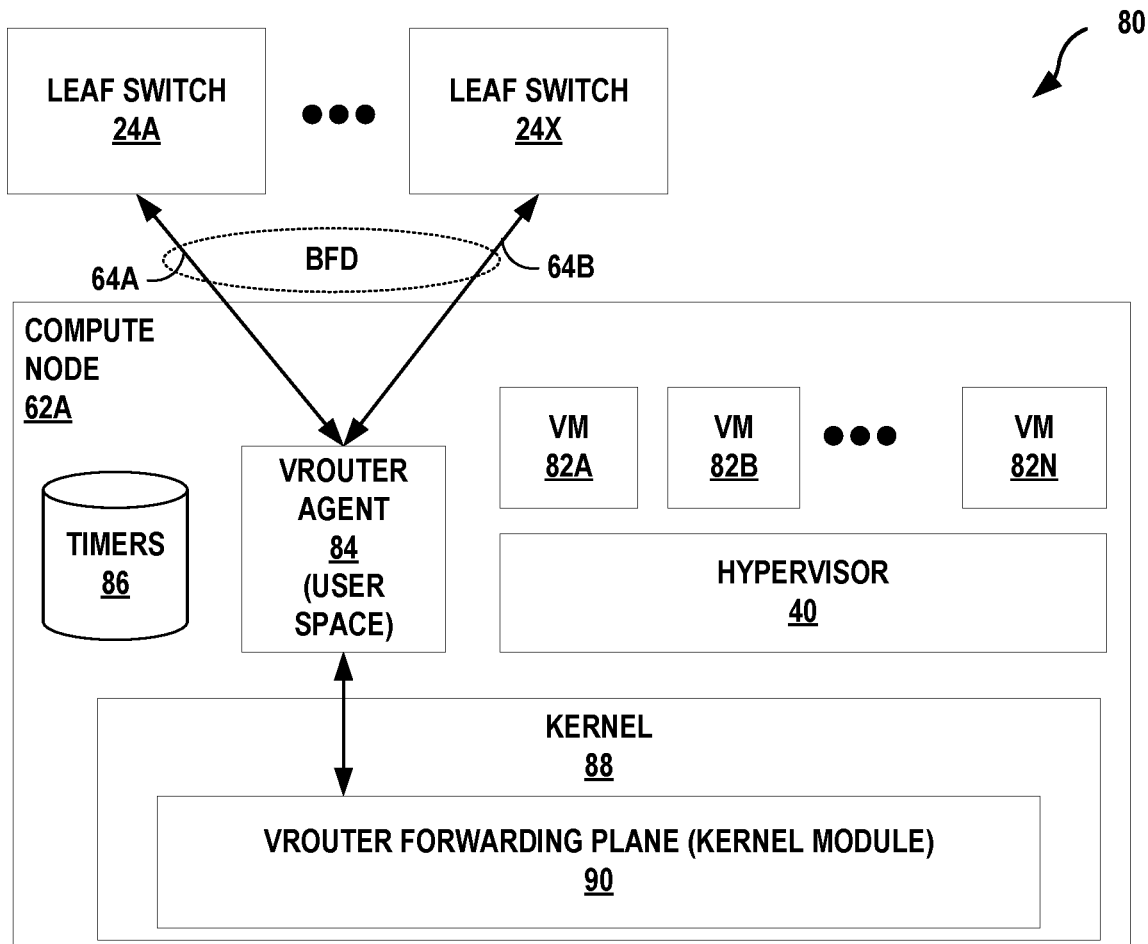
FIGS. 5A-5B are block diagrams illustrating examples of a compute node in further detail, in accordance with the techniques of this disclosure.
Figure 5B:
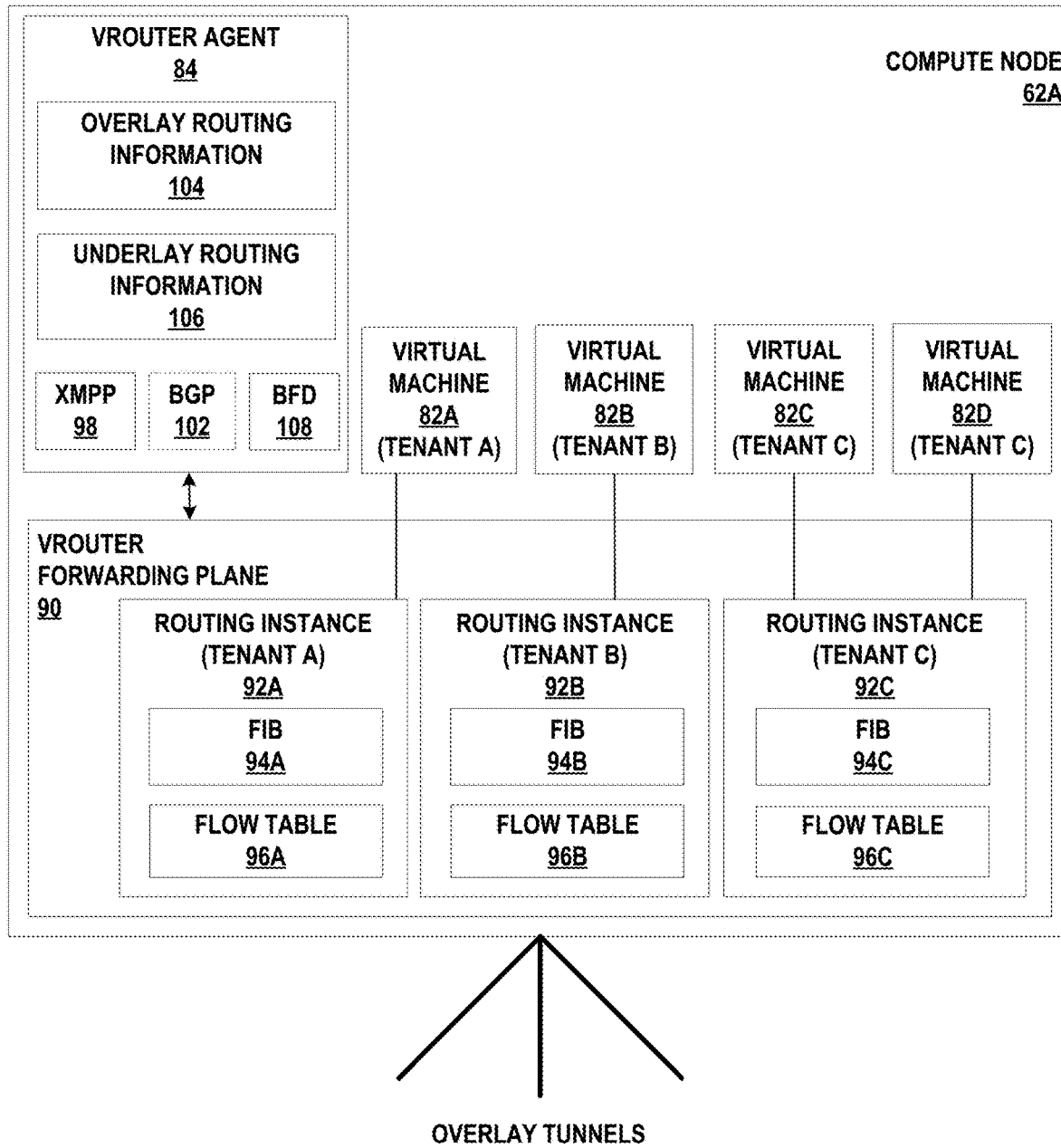

FIGS. 5A-5B are block diagrams illustrating examples of a compute node in further detail, in accordance with the techniques of this disclosure. In the example of FIGS. 5A-5B, the compute node is compute node 62A of FIG. 4. Compute node 62A may be one of compute nodes 26 of FIGS. 1-3. Compute node 62A hosts VMs 82A-82N ("VMs 82"), and may be, for example, a general-purpose x86 server. VMs 82 are tenant VMs running customer applications such as Web servers, database servers, enterprise applications or hosting virtualized services used to create service chains, for example. In one example configuration, Linux is the host operating system (OS).

Two components in a compute node implement a virtual router; namely, the vRouter agent 84 and the vRouter forwarding plane 90. The vRouter forwarding plane 90 is located in the kernel (e.g., Linux), and the vRouter agent 84 is the local control plane.

The vRouter agent 84 is a user space process running inside the kernel. The vRouter agent 84 acts as the local, lightweight control plane and is responsible for the following functions. The vRouter agent 84 exchanges control state such as routes with the control nodes 54 using XMPP sessions. The vRouter agent 84 receives low-level configuration state such as routing instances and forwarding policy from the control nodes 54 using XMPP. The vRouter agent 84 reports analytics state such as logs, statistics, and events to the analytics nodes 50 (FIG. 3). The vRouter agent 84 installs forwarding state into the vRouter forwarding plane 90. The vRouter agent 84 may discover the existence and attributes of VMs in cooperation with a Nova agent of compute node 62A (not shown). The vRouter agent 84 applies forwarding policy for the first packet of each new flow and installs a flow entry for the flow in the flow table of the forwarding plane. The vRouter agent 84 may proxy one or more of DHCP, ARP, DNS, and MDNS, for example. Additional proxies may be included in some implementations. Each vRouter agent 84 is connected to at least two leaf switches 24 for redundancy in an active-active redundancy model.

FIG. 5B illustrates the vRouter forwarding plane 90 of compute node 62A in further detail. The vRouter forwarding plane 90 runs as a loadable kernel process (e.g., in Linux). The vRouter forwarding plane 90 is responsible for the following functions: vRouter forwarding plane 90 enables encapsulating packets to be sent to the overlay network and decapsulating packets to be received from the overlay network. The vRouter forwarding plane 90 assigns packets to a routing instance. Packets received from the overlay network are assigned to a routing instance based on the MPLS label or Virtual Network Identifier (VNI). Virtual interfaces to local virtual machines are bound to routing instances. The vRouter forwarding plane 90 does a lookup of the destination address in the forwarding information base (FIB), also known as a forwarding table, and forwards the packet to the correct destination. The routes may be Layer 3 IP prefixes or Layer 2 MAC addresses, for example.

A forwarding policy can be applied using a flow table 96: The vRouter forwarding plane 90 matches packets against the flow table and applies the flow actions. The vRouter forwarding plane 90 sends the packets for which no flow rule is found (that is, the first packet of every flow) to the vRouter agent 84, which then installs a rule in the flow table 96. The vRouter forwarding plane 90 sends certain packets such as DHCP, ARP, MDNS to the vRouter agent for proxying.

VRouter agent 84 uses XMPP process 98 to establish an XMPP session with a control node of the SDN controller. XMPP process 98 of vRouter agent 84 learns overlay network routes to virtual interfaces (virtual addresses) from VMs 82, and stores these as virtual routes for the virtual interfaces to FIBs 94. XMPP process 98 sends XMPP messages via the XMPP session to control nodes 54 to advertise the overlay network routes. In addition, the vRouter agent 84 XMPP process 98 receives overlay network routes advertised by SDN controller's control node 54A, and stores the overlay network routes to overlay routing information 104 and one or more of FIBs 94. In some examples, vrouter agent 84 also learns underlay network routes from the SDN controller via XMPP messages, and stores these to underlay routing information 106.

As described in further detail below with respect to FIGS. 21A-22, in some examples FIBs 94 may include orthogonal liveness vectors to represent liveness state received from SDN controller. In some examples the SDN controller learned the liveness state from the IP fabric, as described herein.

VRouter agent 84 may use optional BGP process 102 to communicate directly with leaf nodes of IP fabric 20, as described herein. In this example, the compute node is more tightly integrated with IP fabric and exchanges underlay network routes directly, which compute node stores in underlay routing information 106. In other examples, the compute node may not include BGP process 102, and may only learn the underlay network routes from SDN controller via XMPP messages.

BFD 108 establishes a BFD session/adjacency with a leaf node of IP fabric, by which the leaf node can detect reachability/liveness of compute node 62A, as described herein. In some examples, the BFD session may be established over a BGP session, where BGP process 102 is present.

Figure 6:
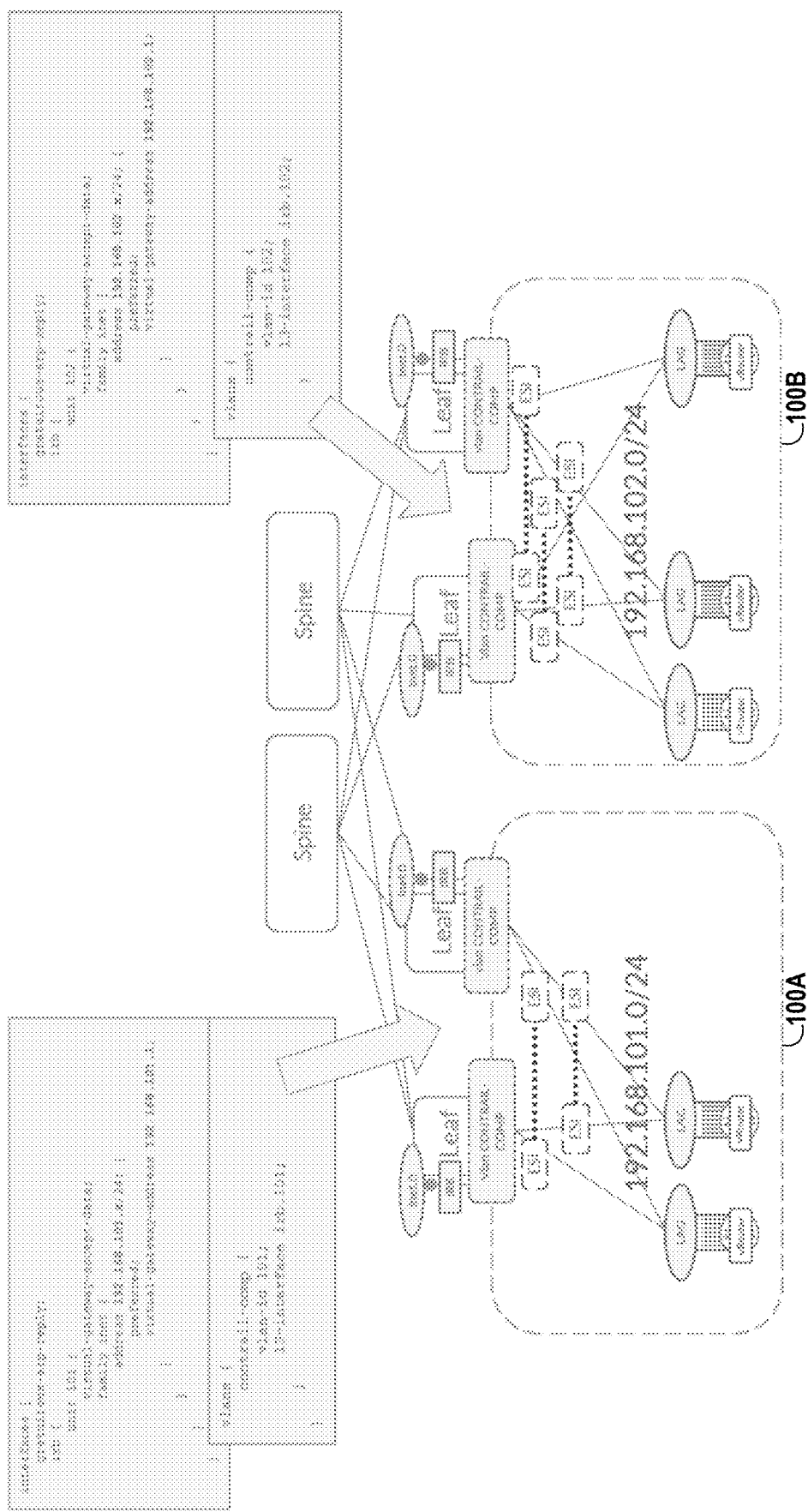
FIG. 6 is a conceptual diagram illustrating a pair of leaf switches with dedicated subnets.

FIG. 6 is a conceptual diagram illustrating a pair of leaf switches with dedicated subnets 100A and 100B ("subnets 100"). FIG. 6 illustrates an edge-routed bridging (ERB) model with a unique subnet 100 per leaf switch pair. In some examples, the "spines" illustrated in FIG. 6 may represent spine switches 22 from FIGS. 1-2, and the "leaves" illustrated in FIG. 6 may represent leaf switches 24 from FIGS. 1-2. Similarly, the vRouters may represent virtual routers as depicted in FIG. 1, and/or virtual routers 42 from FIGS. 2-3.

Propagating the compute node state to the SDN controller via the IP fabric as described herein may provide a good trade-off between scaling, a high level of robustness, and convergence speed. As one aspect, the IP fabric and the vrouter are integrated in an event-based manner. The vRouter-IP fabric integration techniques described herein comply with the deployment of Compute Nodes over link aggregation group (LAG) interfaces. LAG interfaces may be used because, in some examples, the vrouter may not support ECMP connectivity toward Leaf Switches. Additionally, the LAG dependency may also be due to the presence of non-SDN components for which ECMP is not available (e.g., orchestration, deployers, smart network interface cards ("smart-NICS")). In some examples, this design may provide a pragmatic choice for short term deployments.

The following example is based on edge-routed bridging (ERB) with Virtual Machine Traffic Optimization (VMTO) concepts. As shown in FIG. 6, compute nodes are connected to the leaf switches of the IP Fabric via LAG. Each pair of leaf switches has its own subnet/VLAN to connect its local compute node in an Ethernet Switch Identifier (ESI)-redundant fashion. An Integrated Routing and Bridging (IRB) interface is terminated in the default routing table, which grants IP connectivity between vrouters attached to different pairs of leaf switches. The different subnets will have different VLAN identifiers (VLAN-IDs) for the IRBs. The vRouters will send a gratuitous ARP reply that indicates the IP address of the subnet. For example, if the subnet is represented by 192.168.101.0/24, a particular virtual router's IP address may be 192.168.101.1.

Figure 7:
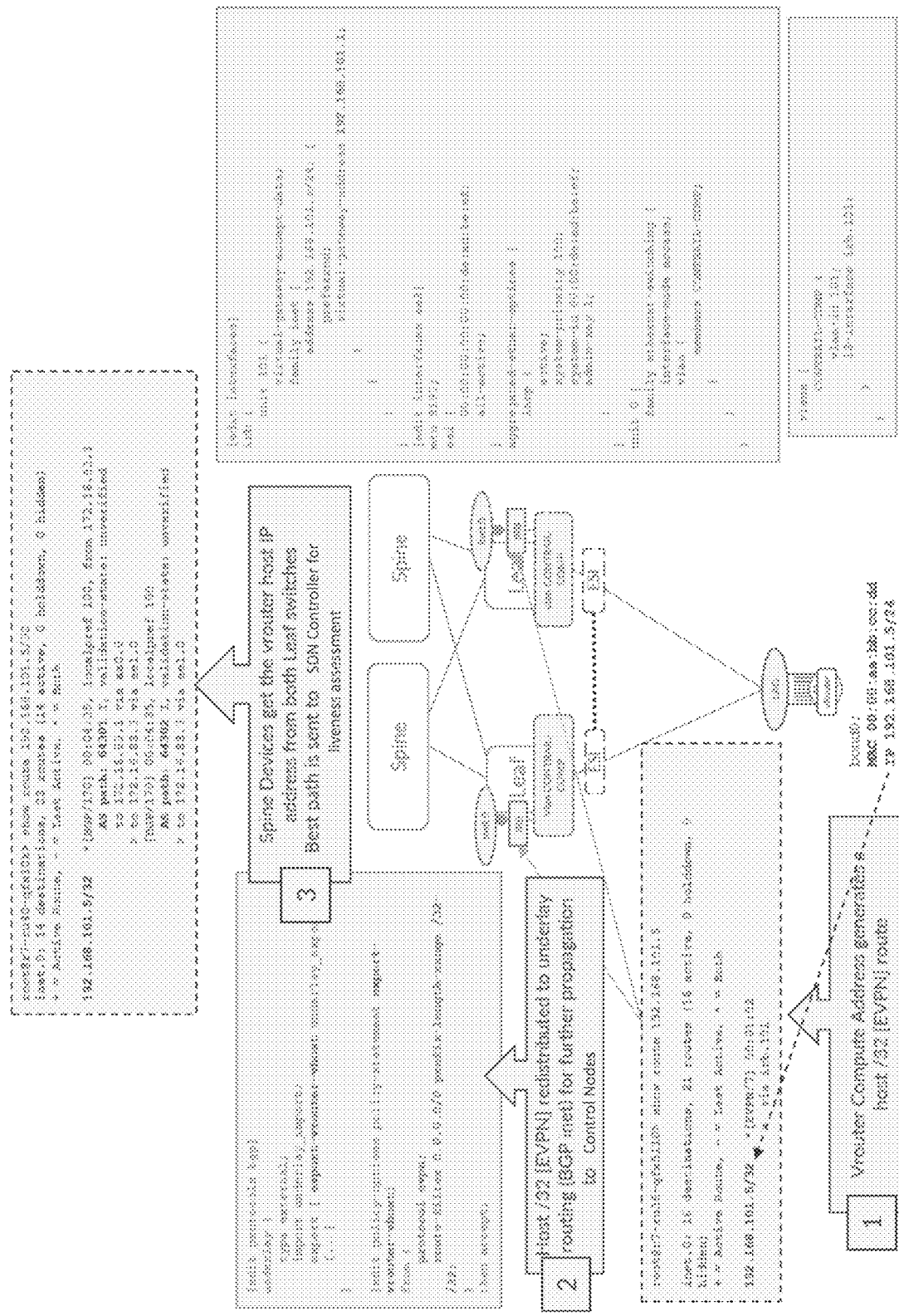
FIG. 7 is a conceptual diagram illustrating virtual router host route redistribution to an IP Fabric using an interior gateway protocol.

FIG. 7 is a conceptual diagram illustrating virtual router host route redistribution to an IP Fabric using an interior gateway protocol (IGP). In some examples, the IGP for this purpose may be exterior Border Gateway Protocol (eBGP). The techniques described in this disclosure permit propagating host address vrouter routes via BGP. FIG. 7 represents the three following steps:

(1) Vrouter compute address generates a host /32 (EVPN) route, or a prefix such as a /32 IPv4 address, /128 IPv6 address, or supernet. Then, at the Leaf switch level, a protocol EVPN /32 route is created for each active host detected on the subnet (upon ARP activity). This entry is synchronized between Leaf switches through EVPN Type 2, which results in both Leaf switches having this entry. (2) The host /32 (EVPN) route entry is redistributed to the underlay routing (BGP routes) so as to be advertised toward spine switches, for further propagation to the Control Nodes of the SDN controller. (3) Spine switches receive the vrouter host IP address from both leaf switches. Spine switches thus store two entries of each Compute node: one to each Leaf switch. The best path is sent to Control Nodes, for subsequent liveness assessment. In case of a Compute node failure, the EVPN host entries are removed at Leaf switches, which triggers BGP route withdrawal toward spine switches (and the SDN controller control nodes).

In some examples, leaf switches may be configured to add a BGP community to the BGP route withdrawal message to uniquely identify compute nodes/vrouters. This permits the Control Node to filter out the relevant vrouter routes based on the BGP community for Next Hop validation.

In some examples, the leaf switch determines vrouter liveness/reachability based on the state of the link/LACP. That is, the leaf switch determines that the compute node is not responding to the BFD session based on a link state of a link state of a MC of the compute node. In some case, the compute node may have bonded NICs, where multiple NICs appear as a single MC. Basing leaf switch determination of the vrouter liveness on the state of the link/LACP may work in case of a shutdown event of a compute node; however, this approach may not work in case of a more complex failure (example vrouter core), where the NIC/bond is operational, while the vrouter agent is down. In this situation, the convergence time can be improved by using micro BFD sessions between vrouter and the pair of Leaf switches. In this case, micro BFD is managed as a vrouter service. In case of vrouter failure, the BFD adjacencies are brought down, which invalidate the host /32 routing entry for the compute node even if NIC links are Up. This improvement involves the following features: Micro BFD adjacency at vrouter agent to check member links (single-hop BFD on member link of the ESI-LAG); and Micro BFD on the ESI-LAG at Leaf switches.

In some examples, configurable XMPP timers may be used. To provide an option to have better than 15 seconds timer in case of vrouter failure, such as in the absence of the previously-described micro-BFD option, configurable XMPP timers may provide a compromise to minimize downtime in a short-term timeline so as to go as low as 3*1 seconds hold-time. This does not reach a sub-second objective, but it can help in situations where more complex micro BFD solutions are not implemented.

Figure 8:
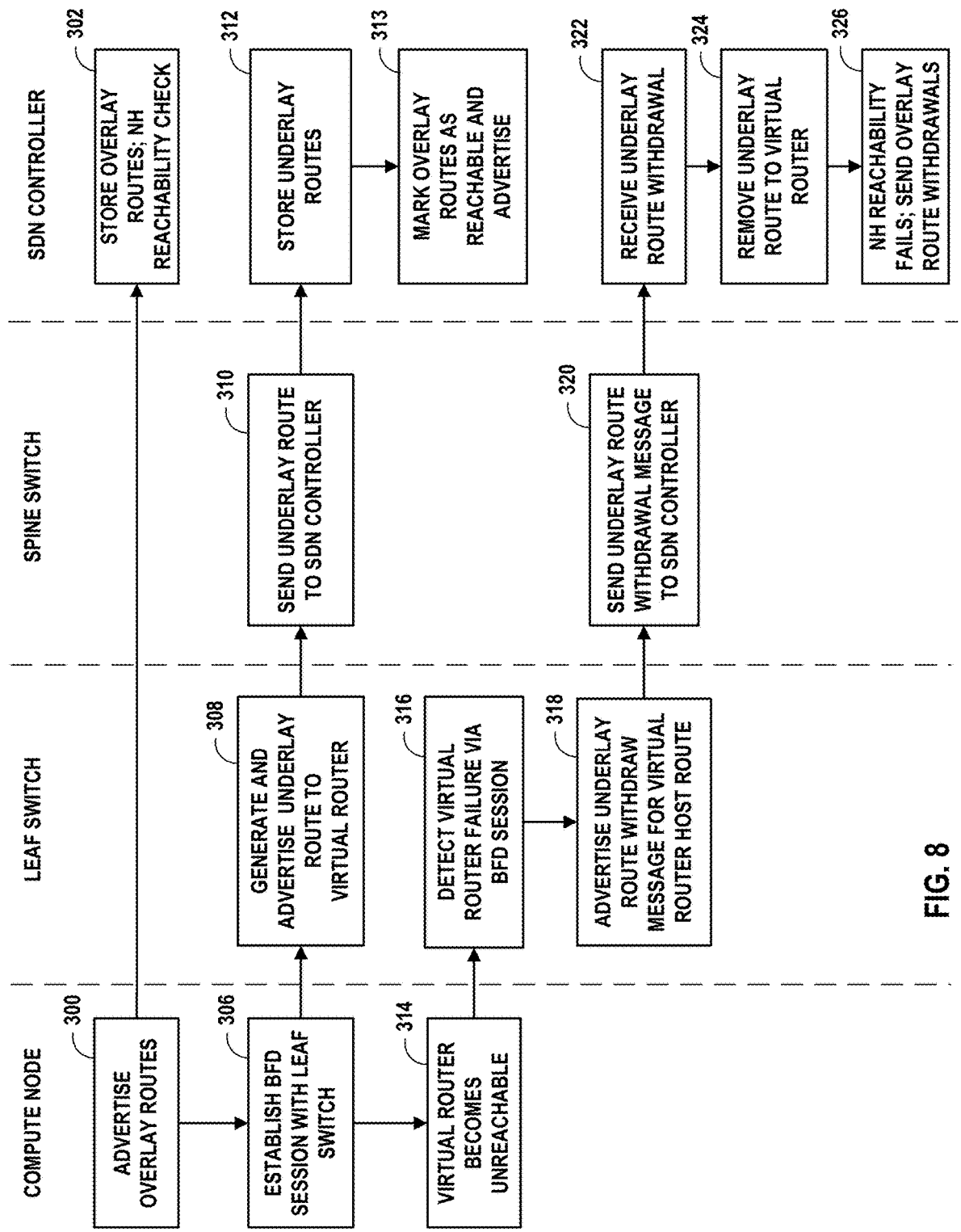
FIG. 8 is a flowchart illustrating example operation of network devices in accordance with aspects of the techniques of this disclosure.

FIG. 8 is a flowchart illustrating example operation of network devices in accordance with the techniques of this disclosure. FIG. 8 will be described with reference to FIGS. 1-2 for purposes of example. A compute node (e.g., compute node 26A) advertises overlay network routes, e.g., via an XMPP session between the virtual router agent and a compute node of the SDN controller (e.g., SDN controller 32). The SDN controller maintains overlay routing information that stores the overlay network routes (e.g., VPN routes) that are advertised to the SDN controller directly by compute nodes or SDN gateways (302). In response to receiving the overlay network route, SDN controller 32 may perform a next hop reachability check, to determine whether the next hop of the overlay network route is "reachable," i.e., whether there exists a corresponding underlay network route to the virtual router or SDN gateway that advertised the overlay network route. If the overlay network route is determined to be reachable, SDN controller 32 may mark the overlay network route as such in overlay routing information (and/or conversely for unreachable routes), and advertises the overlay network route to peers including SDN gateways 8 or compute nodes 26. If the overlay network is determined not to be reachable, SDN controller 32 refrains from advertising the overlay network route to the peers (e.g., until such time as a corresponding underlay network route is received, and the reachability status is updated).

As described in this disclosure, leaf nodes in the IP fabric 20 are configured to run a fault detection protocol session, such as a Bidirectional Forwarding Detection (BFD), between a forwarding plane of each of the leaf nodes and a virtual router of a respective compute node. As part of this, the compute node establishes a BFD session with the leaf switch (306). The leaf switch generates and advertises an underlay route to the compute node (308). For example, the leaf switch may generate and advertise the underlay route to the virtual router in response to detecting ARP activity by the compute node. In some examples, the BFD session is associated with a BGP session established between the leaf switch and the compute node, such that the state of the BGP session is tied to the state of the BFD session. In some examples, the compute node executes a routing protocol process and runs a BGP session to the leaf switch as a BGP peer, and the compute node may send a BGP message to the leaf switch advertising loopback address of compute node, which in turn triggers the leaf switch to generate the routing protocol message to the spine switch.

The nodes of the IP fabric communicate the underlay network route for the virtual router to the SDN controller (310). For example, spine switch 22A sends a BGP message via a BGP session 52. The SDN controller then stores the underlay network route to underlay routing information (312) and based on the existence of the underlay network route to the compute node updates the "reachability" or "liveness" of the virtual router in the overlay routing information and advertises the overlay route associated with the virtual router to peers (313).

When a virtual router of a compute node fails or otherwise becomes unreachable (314), the leaf nodes in the IP fabric can quickly detect when a virtual router has failed, based on the BFD session (316). If the leaf node detects that a virtual router fails or is otherwise unreachable, the leaf node communicates the failure by sending a routing protocol message to a spine node in the IP fabric, withdrawing the underlay network route associated with the virtual router (318). The spine node in turn communicates the underlay network route withdrawal to the SDN controller via BGP session 51 (320), and in response to receiving the underlay route withdrawal (322), the SDN controller updates its underlay network routing table to remove the underlay network route for the unreachable virtual router from the underlay routing information (324). Because the underlay network route has been removed from the underlay routing information, now any overlay network routes that depend upon this underlay network route fail the next hop reachability check, so the SDN controller updates its overlay routing information to remove any dependent prefixes from the overlay routing information.

The SDN controller then sends messages to other compute nodes, SDN gateways, or other devices to withdraw the overlay and underlay network routes associated with the unreachable virtual router (326). For example, the SDN controller may send messages to the other compute nodes via XMPP, and may send messages to the SDN gateways via BGP.

In this way, the SDN controller is configured to tie advertisement of the overlay network routes (VPN routes) to the presence or absence of the static, underlay network route. The SDN controller only advertises an overlay network route, for a given virtual router, to the other virtual routers of the overlay if the static underlay network route exists. By triggering and controlling the withdrawal of the underlay network route via BFD, the SDN controller controls the advertisement of the overlay routes, which otherwise cannot be tied to liveliness detection by BFD. For example, the SDN controller determines, based on whether an underlay network route is stored for a destination, whether a next hop for a corresponding overlay network route for the destination is reachable by the SDN controller, the underlay network route comprising a route advertised by a node in an IP fabric of an underlay network, and in response to determining the next hop for the overlay network route is unreachable, refrains from advertising, by the SDN controller, the overlay network route and withdrawing the overlay network route from any network peers to which the overlay network route was previously advertised.

Although not depicted on the FIG. 8, the other compute nodes, SDN gateways, and other devices that receive the messages will then in turn update their stored routing information and/or forwarding planes so as to stop forwarding traffic to the unreachable virtual router. In some examples, the compute nodes and/or SDN gateways will be configured to update their forwarding planes using techniques for local repair using an orthogonal liveness vector by prefix-independent convergence that are described herein.

Figure 9:
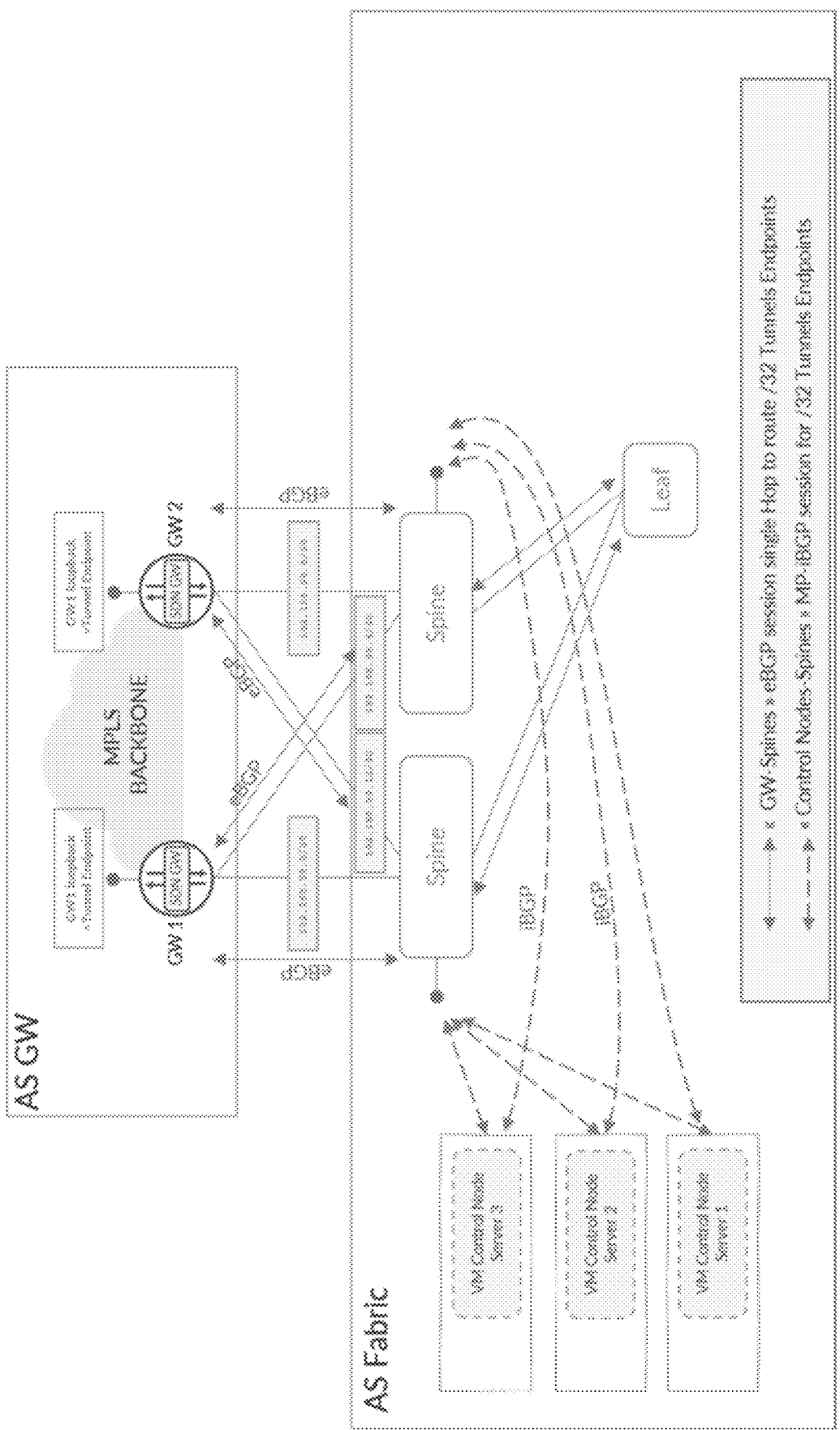
FIG. 9 is a conceptual diagram illustrating external BGP peering between an autonomous system that includes SDN gateways and an autonomous system that includes the IP fabric and SDN controller.

FIG. 9 is a conceptual diagram illustrating external BGP peering between an autonomous system that includes SDN gateways and an autonomous system that includes the IP fabric and SDN controller. The underlay routing uses BGP to provide /32 tunnel endpoint reachability across the extended fabric provided by the autonomous system having the IP fabric and SDN controller. As used herein, /32 tunnel endpoint may be this, or, e.g., a prefix such as a /32 IPv4 address, /128 IPv6 address, or supernet. However, the Fabric device that peers with Control Node for /32 Loopback must not be a Tunnel Endpoint itself (or connect to a vrouter). Indeed, if both forwarding and routing functions are merged, routing convergence is slow in case of failure because a failed device cannot send an indication of its own failure (simply because it is already failed). Hence, peering for underlay routing cannot be set between gateways and control Nodes, because Gateways are Tunnel Endpoint. For this purpose, it is proposed to set-up these peerings with Spines devices (assuming that no vrouter is connected to spines). One design alternative would be the local Leaf switches to which the Control Nodes are attached; however, this approach may be more complicated to orchestrate and maintain compared to relying on a permanent well-defined termination at spine level.

Overlay routing for services relies on the following approach. MP-eBGP multihop sessions are used for services (EVPN, VPNv4/v6, route-target . . . ). No peering is defined toward the Fabric to spare the Fabric Control Plane, which can be dedicated to the routing of Tunnel Endpoint. Note that Bare Metal Server integration will require service prefix routing, which can be minimized with family route-target. In this example, a MP-EBGP multihop session is used between the control node and the SDN gateway loopbacks.

The following describes operations of the SDN gateway, e.g., SDN gateway 8. A routing-based check may be employed by SDN gateway 8 to bring down MPLSoUDP Tunnels based on the existence of the /32 Tunnel Endpoint (compute node). Once the Tunnel is brought down, overlay prefixes are invalidated due to the absence of entry in the routing table (RIB). An architecture that permits dynamically advertising compute host routes to the SDN Gateway makes it possible to use this technique to strictly bind the status of the compute node to the state of MPLSoUDP Tunnel. This control may be made possible via the configuration of a policy in the dynamic-tunnel configuration stanza.

A generic configuration example is provided below. Note that this principle can be enhanced by attaching communities to vrouter host routes at leaf switch redistribution and matching them in the policy for more granularity.

Configuration example to enforce strict next-hop validation check based on host routes reception:

```
[edit routing-options]
dynamic-tunnels {
    forwarding-rib inet.0 {
        inet-import udp-tunnel-host-routes-only;
    }
    contrail {
        source-address 172.16.84.11;
        udp;
        destination-networks {
            10.0.0.0/8;
        }
    }
}
[edit policy-options]
policy-statement udp-tunnel-host-routes-only {
    term 1 {
        from {
            protocol bgp;
            route-filter 0.0.0.0/0 prefix-length-range /32-/32;
        }
        then accept;
    }
    term 2 {
        then reject;
    }
}
```

Figure 10:
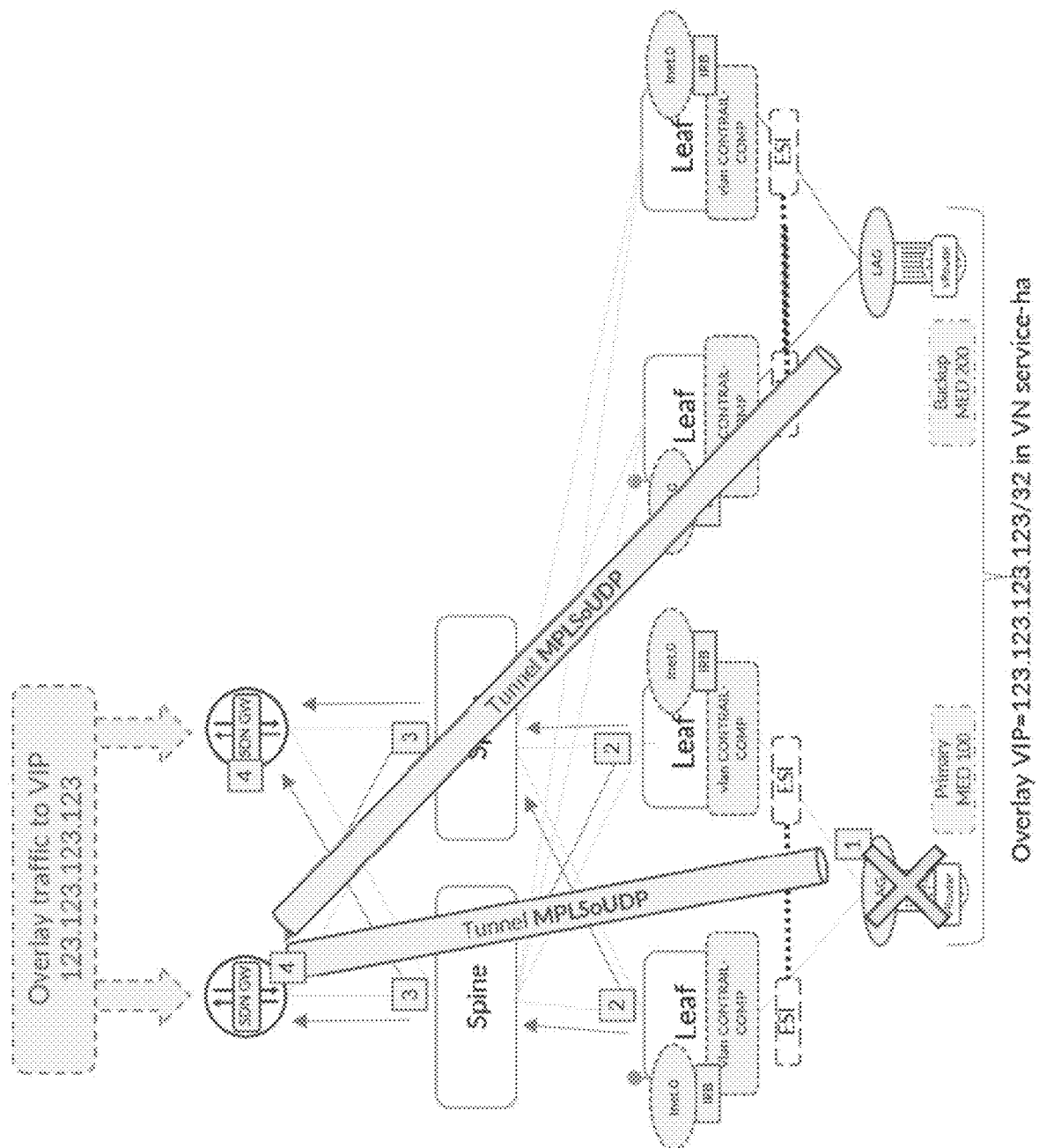
FIG. 10 is a conceptual diagram illustrating a system in which nodes of the IP fabric notify an SDN gateway of a compute node failure.

FIG. 10 is a conceptual diagram illustrating a system in which nodes of the IP fabric notify an SDN gateway of a compute node failure. FIG. 10 illustrates MPLS over UDP tunnels between an SDN gateway and vrouters. In some examples, the "spines" illustrated in FIG. 10 may represent spine switches 22 from FIGS. 1-2, and the "leaves" illustrated in FIG. 10 may represent leaf switches 24 from FIGS. 1-2. The SDN gateways may represent SDN gateways 8, and the vRouters may represent virtual routers as depicted in FIG. 1, and/or virtual routers 42 from FIGS. 2-3.

In the example of FIG. 10, a virtual compute node prefix "virtual IP" 123.123.123.123/32 is reachable via two high availability workloads in Virtual Network "service-ha". These workloads are located on two distinct compute nodes.

Under normal operations, the SDN Gateway receives overlay prefixes from both compute nodes due to distinct route distinguishers. By default, ECMP is happening toward these destinations. In other words, the traffic is load balanced to both vrouters via IP Tunnels. In this case, a primary/backup design is enforced through Multi-Exit Discriminator (MED) instantiation: lowest MED has priority over highest MED Both scenarios will work similarly.

FIG. 10 illustrates numbered steps 1-4. Should a compute node failure happen ("step 1"), the fabric propagates BGP withdrawal for the vrouter host IP address up to the SDN Gateway. Specifically, the leaf switches detect the compute node failure (link down detected via BFD), and the vrouter host route BGP withdraw is advertised to the spine ("step 2"). The spine node propagates the BGP withdrawal information up to the SDN gateway ("step 3"). At the SDN gateway level, based on the dynamic tunnel policy requiring an exact match, the gateway can invalidate the Tunnel Next-hop and update Forwarding information ("step 4"). All traffic is diverted to the remaining destination for the virtual IP of 123.123.123.123 (local or more PE depending on label policy). This operation depends on the gateway configuration and design as follows. In the case of pure MPLS-based forwarding: This option relies on the default per prefix label allocation policy (Option B). The withdrawal information is propagated all the way up to the ingress PE (remote PE), where path selection happens. The remote PE itself diverts traffic to the MPLS Label that corresponds to the backup Tunnel.

In the case of IP-based forwarding, Either VRF is configured for the Virtual Network with the "vrf-table-label" configuration (per VRF label allocation policy), or an option A connectivity between the gateway and the backbone network is implemented. In this case, the gateway diverts traffic toward the virtual IP to the backup Tunnel.

In some examples, other approaches for fast convergence can alternatively or additionally be tactically deployed for specific use cases, in addition to or in the alternative to the approach described above, such as public cloud where compute nodes can be deployed across several locations. One example approach for fast convergence uses endpoint-to-endpoint BFD, which could be incorporated in a network in addition to or in the alternative to the approach described above. With the endpoint-to-endpoint BFD approach, BFD adjacencies are established between all Tunnel Endpoints. That is, BFD adjacencies are established between the SDN gateways and vRouters, as well as between pairs of vRouters. The tunnels may be MPLS over UDP tunnels. BFD Hello messages can be sent either within the overlay or at the underlay level (multihop BFD).

One feature of this approach is it may provide a pure overlay solution independent of the underlay, in that no specific provisioning is needed at the underlay level except at the SDN Gateway, and things can be managed solely between the vRouter and the Gateway. No specific automation is needed at the IP fabric level, as this approach does not require any specific configuration in the fabric.

The endpoint-to-endpoint BFD approach involves configurations at the gateway and the vrouter level. At the vrouter, the vrouter-agent is configured to update its vrouter's forwarding information in case of loss of an adjacency. This is a local decision. The number of BFD adjacencies to manage at an Endpoint is proportional to the number of Endpoints in the cluster (or sub-cluster in case of remote compute). For example, assuming a cluster of 50 vrouters, each vrouter must maintain fifty BFD sessions to detect any remote failure. Assuming a 100 msec BFD interval and 50 ports with BFD, the CPU must process 10*50=500 packets per second. To manage the scalability of this approach, in some examples, this approach may include an option to selectively apply BFD on critical computes (i.e., it hosts a critical VM or critical Virtual Network) and not apply BFD on non-critical computes. In some examples, higher BFD timers can be implemented depending on the criticality of the traffic.

The endpoint-to-endpoint BFD approach is a multihop BFD strategy. Therefore, the BFD timers should be set above the convergence time of the IP fabric, with a reasonable margin to cope with unexpected scenarios. Indeed, with an ECMP load balancing design, no assumption can be made on path non fate sharing between primary and backup path reaching two endpoints, unless the IP fabric is based on Segment Routing. Hence, any fabric issue can affect both BFD sessions for primary and backup path. Therefore, BFD timers must be defined so as to not expire on any single fabric failure. Note that when transported in the overlay, BFD can actually be configured single hop BFD (or even BFD lite); however, this is a multihop scenario because of the underlying Fabric devices.

Another example approach for fast convergence, which could be incorporated in a network in addition to or in the alternative to the approach described above, is to run BFD on the signaling protocol sessions between the SDN controller and the SDN gateways (MP-BGP) or the compute nodes (XMPP). This means that BFD would be run between the SDN controller control nodes and the Tunnel Endpoints so as to detect any failure of the tunnel endpoints, i.e., BFD between SDN controller Control Nodes and SDN Gateways, and BFD between Control Nodes and vrouters of the compute nodes. This would require configuring BFD on Control Nodes and on vrouters vhost0 interface, (i.e., vrouter Fabric interface).

This approach also provides a pure overlay solution independent of the underlay: no specific provisioning at underlay level except at the SDN Gateway, and things must be managed solely between the vRouter and the Gateway. No specific automation is needed at the IP fabric level, as this approach does not require any specific configuration in the fabric. At the SDN gateway, BGP with BFD may already be configured, but this approach may require development at the vrouter and control node in some examples.

Multihop versus cluster stability: one potential drawback of this approach is false positives due to Fabric convergence events. This can affect all BFD sessions at once (e.g., both gateways and dozens of vrouters at once), which generate service interruption as well as massive signaling withdrawal events. Hence, to preserve the cluster stability, BFD timers must be chosen in a conservative manner to make sure that any transient fabric issue does not bring down any of the signaling sessions. In other words, aggressive BFD timers (sub-second) are avoided in such a scenario in order to not cause more problems than it solves. Another potential drawback from this approach is that convergence is managed at the overlay/service level (withdraw), and there is a linear dependency of convergence at the SDN Gateway level (the more prefixes, the slower convergence will be).

Figure 11:
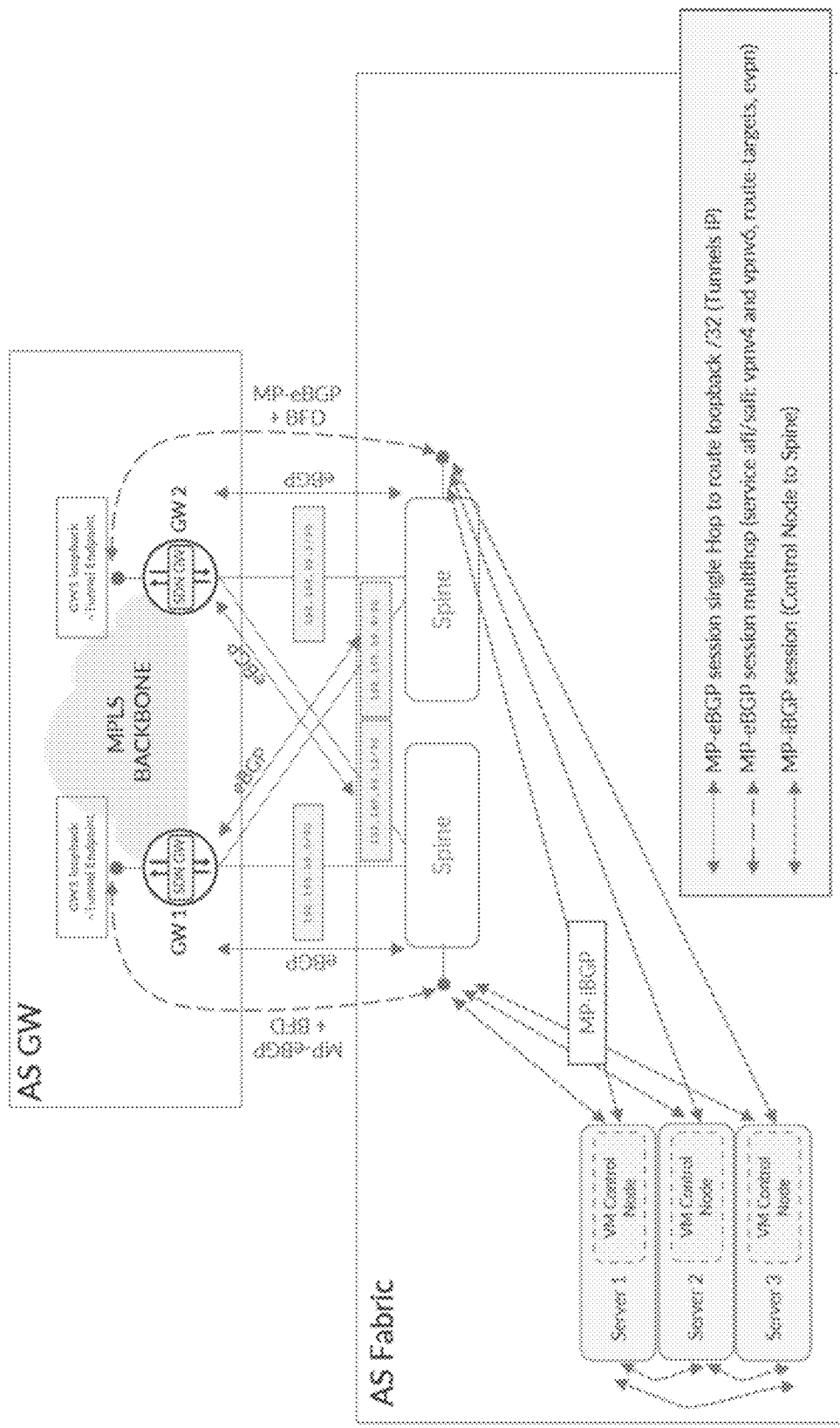
FIG. 11 is a conceptual diagram illustrating a network topology that uses multihop eBGP between the SDN gateways and spine switches.

FIG. 11 is a conceptual diagram illustrating a network topology that uses multihop eBGP between the SDN gateways and spine switches. As described herein, it is possible to decrease downtime by having a Control Node's MP-BGP session peering to Fabric Nodes (e.g., Spine switch or dedicated Leaf switch, depending on the context). Indeed, by differentiating Signaling Nodes (spine switches) and Tunnel Endpoint (Gateway), it is possible to quickly detect a Gateway failure and trigger route withdrawal toward Control Nodes.

There are several design variations to achieve this objective. For example, autonomous system (AS) assignments may be internal or may be external. As another example, next hop resolution or BFD may be used. In some examples, a network design may include two BGP Autonomous Systems (overlay): a SDN Gateway AS and an autonomous system made up of the "SDN controller plus IP Fabric."

One example may use Single Hop eBGP peering between Gateways and Spines to dynamically exchange Tunnel Endpoint IP addresses (e.g., SAFI 1/1 routes for loopback—Ipv6 may not be supported for IP Tunnels). Another example may use Multihop EBGP between Gateways Loopbacks and Spine Loopbacks with sub-second BFD timers (3*100 msec timers), where the TTL is set to 2 to make sure that multihop peerings "stick" over the direct link (i.e., detect routing errors).

FIG. 11 illustrates a BGP-specific implementation related to the Spine switches peering with the Control Nodes. The following is an example spine switch configuration template for a spine switch peering with an SDN gateway and an SDN controller:

```
# Make sure that next-hops resolution succeeds in inet.3 (leaking from
inet.0 is also an option)
routing-options
    { rib inet.3 {
    static {
        route 0.0.0.0/0 discard;
    }
    }
}
# BGP configuration guidelines
protocols {
    bgp {
# Peer-group toward gateways for underlay Tunnel Endpoint routing
(Loopback and vrouter vhost IP) group gw-underlay {
        export pol-exp-local-loopback; # Make sure to advertise the
    local Loopback to eBGP
        type external;
        peer-as *Gateway-AS*;
        neighbor *link-Gateway-1* {
            description link-gw-1;
        }
        neighbor *link-Gateway-2* {
            description link-gw-2;
        }
    }
# Peer-group toward gateways for overlay routing (service: here VPNv4
and VPNv6): "no-next-hop-change" is mandatory for proper operations.
    group gw-overlay {
        type external;
        multihop {
            no-nexthop-change;
            ttl 2;
        }
        local-address *Local-Loopback-Spine*;
        family inet6-vpn {
            unicast;
        }
        family inet-vpn {
            unicast;
        }
        family route-target {
            external-paths 255;
        }
        peer-as *Gateway-AS*;
        multipath;
        bfd-liveness-detection {      # BFD is implemented here -
    although this is multihop: -
            minimum-interval 100;
            multiplier 3;
            no-adaptation;
```

```
        }
        neighbor *Loopback-Gateway-1* {
            description loopback-gw-1;
        }
        neighbor *Loopback-Gateway-2* {
            description loopback-gw-2;
        }
    }
# Peer-group toward contrail control nodes
    group contrail-control-nodes {
        type internal;
        local-address *Local-Loopback-Spine*;
        family inet-vpn {
            unicast;
        }
        family inet6-vpn {
            unicast;
        }
        family route-target {
            external-paths 255;
        }
        no-client-reflect;
        multipath;
        neighbor *Contrail-Control-Node-1* {
            description control-node-1;
        }
        neighbor *Contrail-Control-Node-2* {
            description control-node-2;
        }
        neighbor *Contrail-Control-Node-3* {
            description control-node-3;
        }
    }
}
```

The following is an example SDN Gateway BGP Configuration for an SDN gateway peering with a spine switch.

```
protocols {
    bgp {
# Peer-group toward gateways for underlay Tunnel Endpoint routing
(Loopback and vrouter vhost IP)
        group spine-overlay {
            export pol-exp-local-loopback; # Make sure to advertise the
    local Loopback to eBGP
            type external;
            peer-as *Fabric-AS*;
            neighbor *link-spine-1* {
                description link-spine-1;
            }
            neighbor *link-spine-2* {
                description link-spine-2;
            }
        }
# Peer-group toward gateways for overlay routing (service: here VPNv4
and VPNv6): next-hop is self here (i.e. default eBGP mode).
    group gw-overlay {
        type external;
        multihop {
        ttl 2;
        }
        local-address *Local-Loopback-GW*;
        family inet6-vpn {
        unicast;
        }
        family inet-vpn {
        unicast;
        }
        family route-target {
            external-paths 255;
            advertise-default;
        }
        peer-as *Fabric-AS*;
        multipath;
        bfd-liveness-detection {      # BFD is implemented here -
    although this is multihop:
            minimum-interval 100;
```

```
        multiplier 3;
        no-adaptation;
    }
    neighbor *Loopback-Spine-1* {
        description loopback-spine-1;
    }
    neighbor *Loopback-Spine-2* {
        description loopback-spine-2;
    }
}
```

Figure 12:
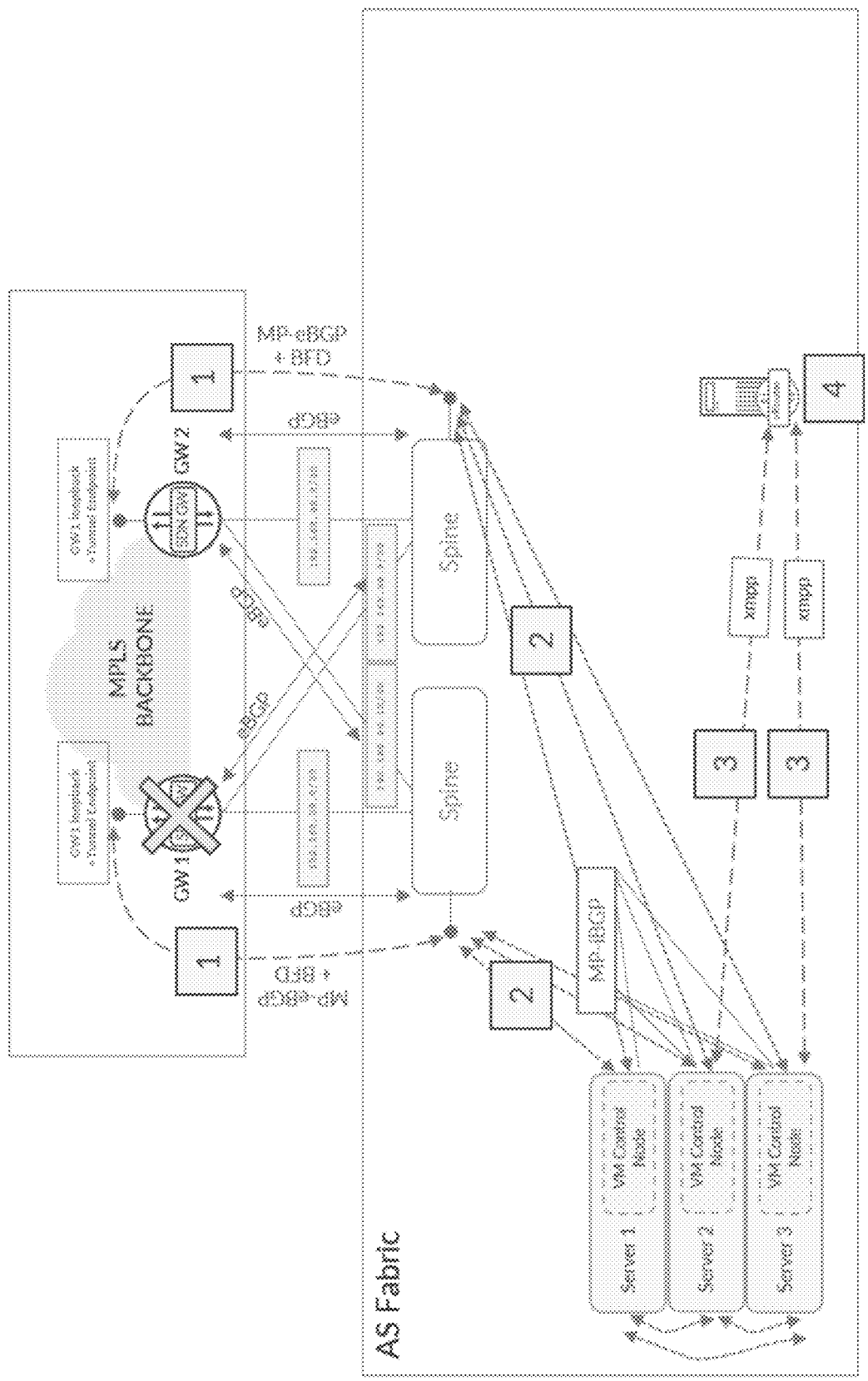
FIG. 12 is a conceptual diagram illustrating an example process for convergence in the case of failure of an SDN gateway.

FIG. 12 is a conceptual diagram illustrating an example process for convergence in the case of failure of an SDN gateway (e.g., SDN gateway 8). In case of failure of an SDN Gateway, the following sequence of event occurs: 1. The BFD session between the spine switch and the default SDN gateway is torn down. 2. This results in spine switches sending MP-UNREACH update messages to all Control Nodes for all prefixes reachable via the defective SDN gateway. 3. The Control Nodes subsequently generates an XMPP update to vrouters with the defective SDN gateway removed from the list of Next-Hops (i.e., single Next-Hop=GW2). 4. The vrouter agent updates the local data plane, removing the default SDN gateway.

In this manner, the time it takes for the SDN controller control node to detect SDN gateway failure is no longer subject to the BGP holdtime expiration, because the now local Spine switch detects this failure due to the BFD session between SDN gateway and spine switch (300 msec). Hence, the convergence time is greatly improved (the BGP/xmpp propagation is actually very fast for a small number of prefixes). However, there remains linear dependencies with respect to the number of prefixes to be updated. In case of high route scaling—labels actually-, the sub-second convergence may be challenging to meet. In some examples, the nodes that need to update their forwarding planes in response to learning of the failure from the SDN controller can use the local repair using PIC techniques described below.

Figure 13:
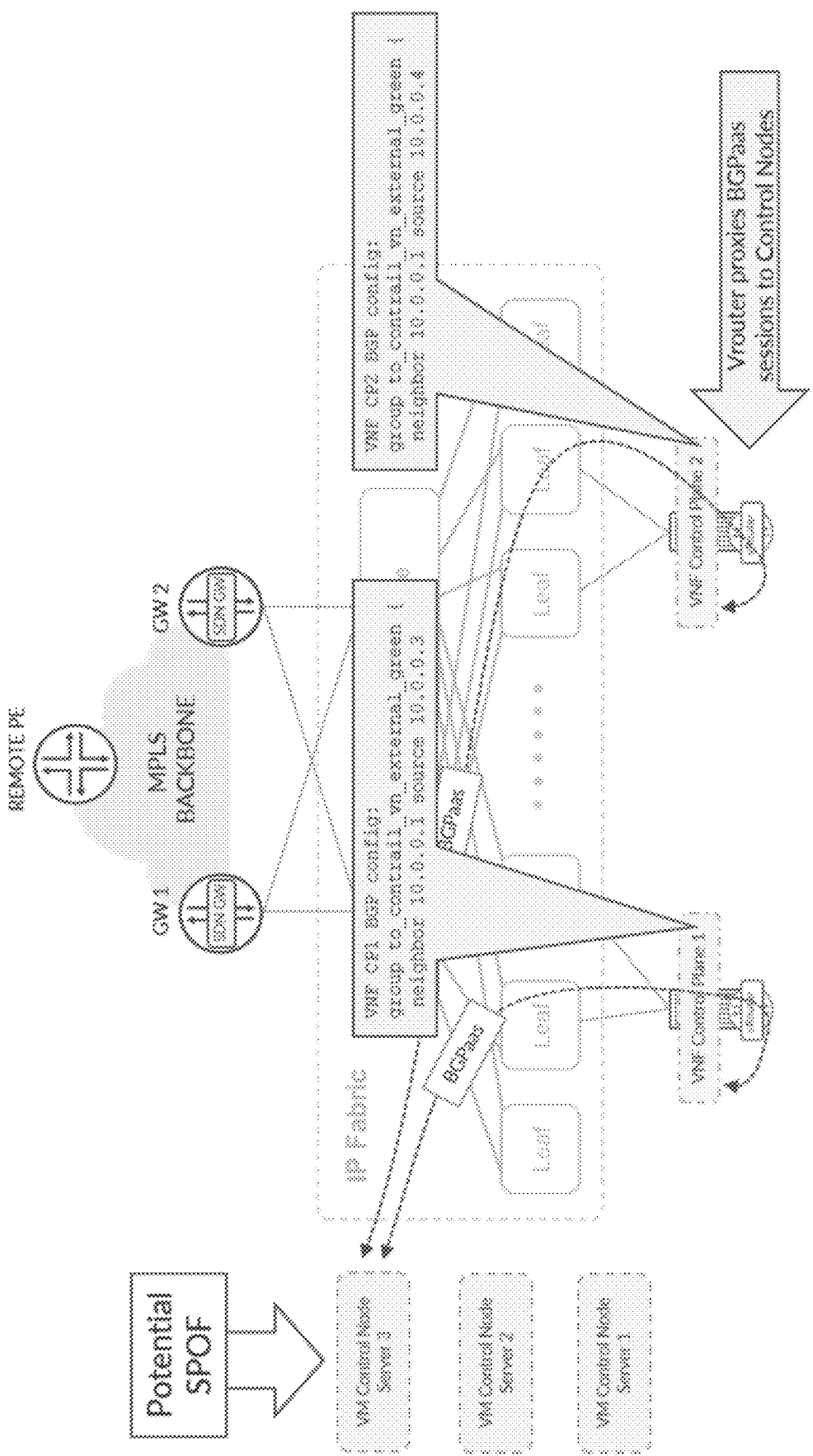
FIG. 13 is a conceptual diagram illustrating a BGP as a service (BGPaas) arrangement in which a single control node provides a single point of failure.

FIG. 13 is a conceptual diagram illustrating a BGP as a service (BGPaas) arrangement in which a single control node provides a single point of failure. In the example of FIG. 13, the vrouters proxy BGPaas sessions to a control node on "server 3". In some implementations, such as in the absence of the techniques of this disclosure, the XMPP holdtime timer is the only way for Control Nodes to be notified of a Compute failure. The failure detection for SDN controller is therefore 15 seconds. Notwithstanding, in case of BGPaas implementation, it is possible to modify the holdtime to lower values (2*3 or even 1*3 seconds), so the BGPaas session can be torn down faster if a control node fails.

FIG. 13 illustrates the default behavior with a VNF implementing a redundant Control Plane based on two BGPaas sessions. Local Hashing at vrouter may balance both BGPaas to the same Control Node (Server 1), which becomes a single point of failure ("SPOF"). Thus, in FIG. 13, the vrouters perform non-deterministic proxying of bgpaas session to Control Nodes. The following describes techniques for avoiding the single point of failure in the BGPaas context.

Figure 14:
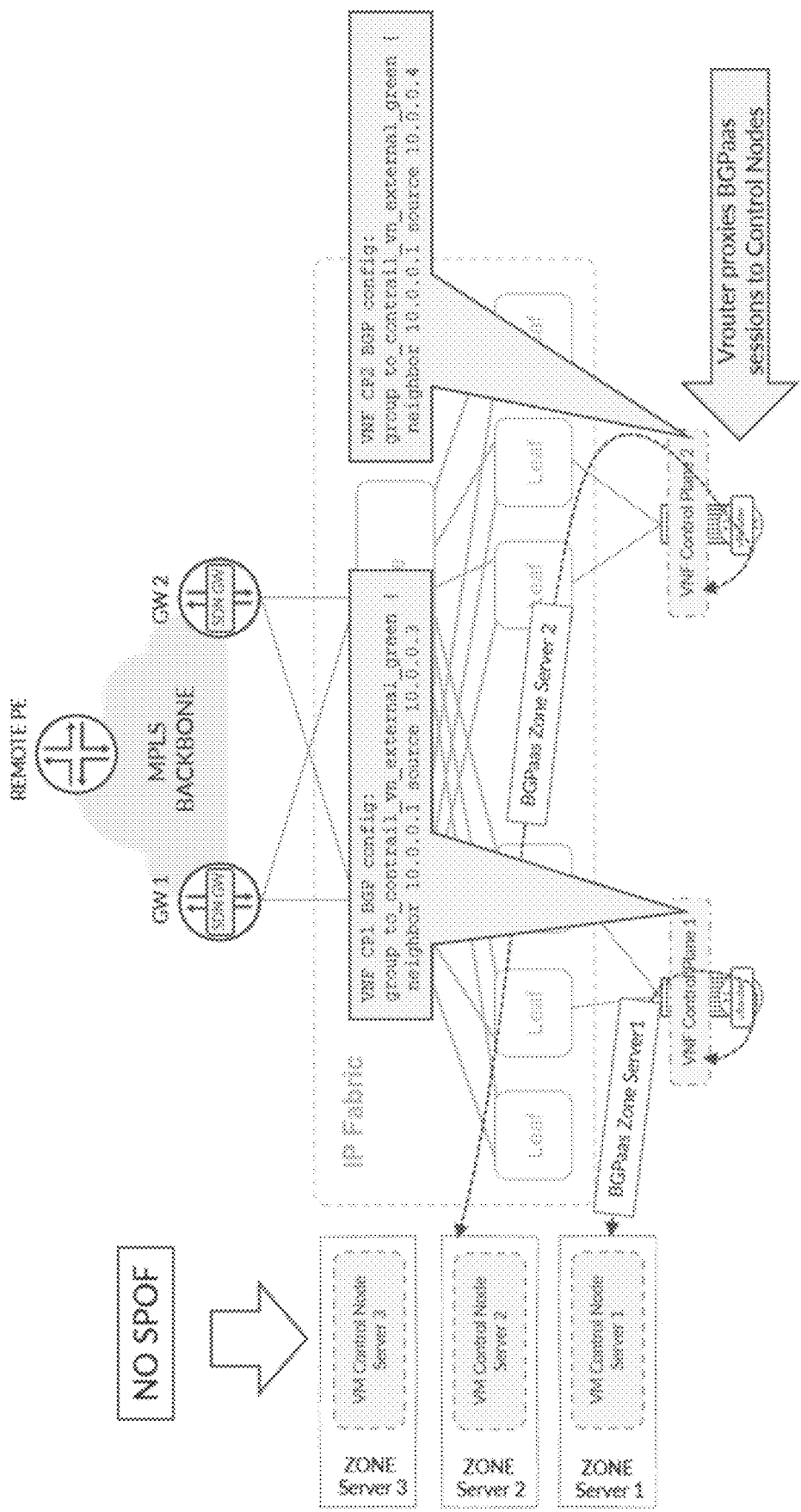
FIG. 14 is a conceptual diagram illustrating a redundant BGPaas design using BGPaas Control Node zones.

FIG. 14 is a conceptual diagram illustrating a redundant BGPaas design using BGPaas Control Node zones. The use of Control Node zones allows for deterministic bgpaas anchoring to Control Nodes. Using a BGPaas Control Node zone permits a high availability option by binding BGPaas peers to a deterministic Control Node, in contrast to the non-deterministic binding shown in FIG. 12. The approach shown in FIG. 14 guarantees that a single Control Node failure is hitless when two redundant BGP peers are set up by a VNF.

The BGPaas Control Node zone defines an affinity between BGPaas peers and Control Nodes. A zone may contain: One or several BGPaas peers; and One or several Control Nodes so load balancing within a Zone to a set of control Nodes is possible to scale out a zone. Typically, in a deployment having three control nodes, two zones are defined, each mapping to a unique Control Node. Zones are subsequently attached to the VNF BGPaas sessions in order to define a non-fate-sharing architecture.

Figure 15:
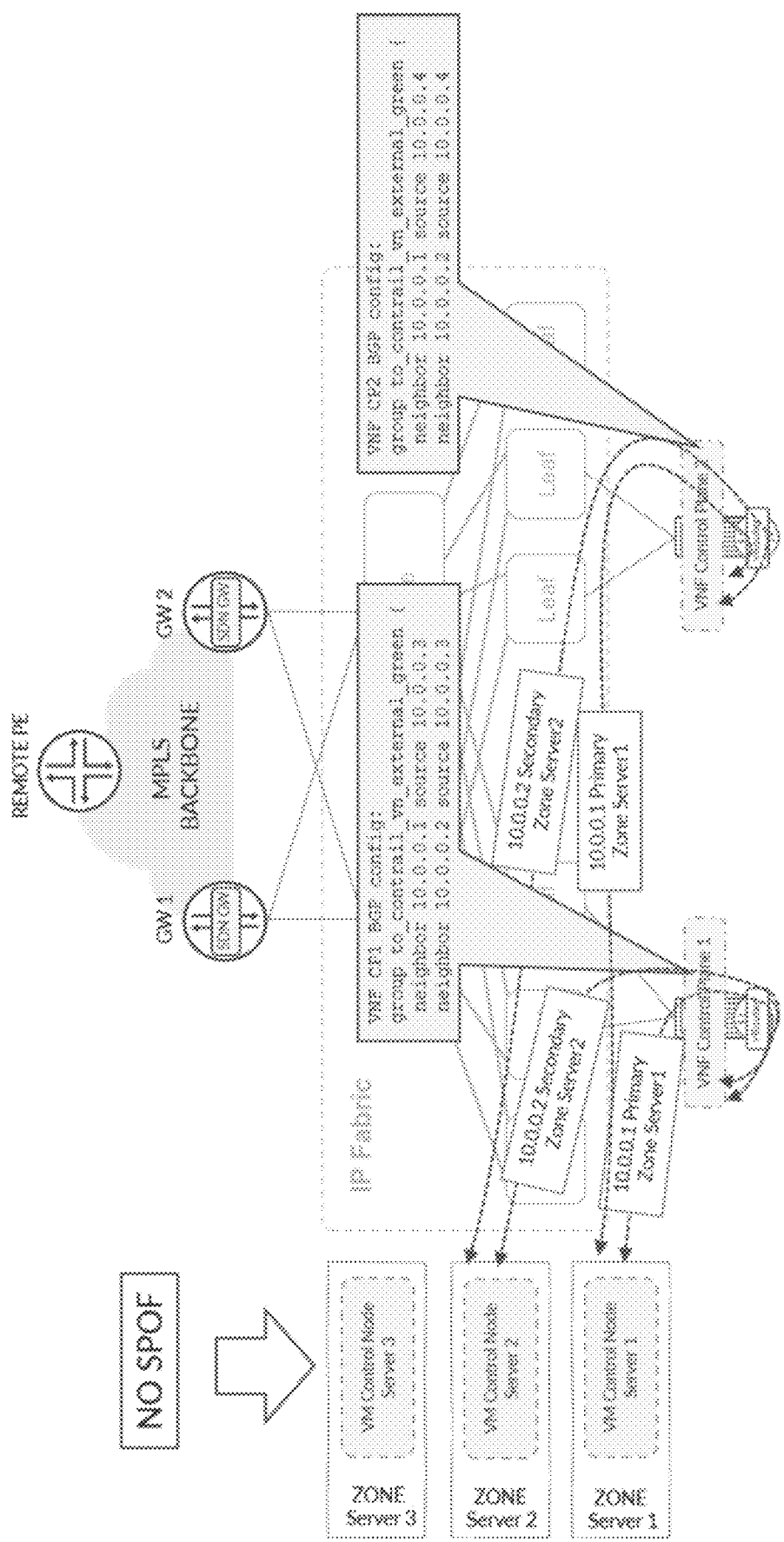
FIG. 15 is a conceptual diagram illustrating a redundant BGPaas design using primary and secondary control node zones to improve VNF routing stability.

FIG. 15 is a conceptual diagram illustrating a redundant BGPaas design using primary and secondary control node zones to improve VNF routing stability. In some scenarios, each VNF Control Plane VM may require redundant peering to maximize the stability of the routing. In other words, 2*2 BGP sessions are required by the VNF design. This scenario is supported through the use of Primary and Secondary BGPaas zones, as shown in FIG. 15, where the primary and secondary BGPaas control node zones map to the vrouter Gateway (e.g. X.Y.Z.1/24) and the vrouter DNS IP addresses (e.g. X.Y.Z.2/24), respectively.

Some network implementations may need to integrate Bare Metal Server (BMS) together with Compute node Virtual Machines. The below design recommendations are the current best practice for this integration. One approach is to prevent BMS and vrouters from being connected to the same pair of Leaf switches. In other words, Bare Metal Servers and vrouter must be connected to different leaf switches/servers for proper BMS to VM/pods connectivity.

The following describes example aspects for BMS attachment on the IP Fabric. Bare Metal Servers should not be connected on Spine switches. This is due to having Control Nodes peer with the spine switches, as described herein for advertising underlay network routes from the IP fabric to the control nodes of an SDN controller.

If a BMS is connected to a spine, this may result in a similar convergence situation as with the gateway failure case, with following the differences: BMS is remote PE; Spine is the GW; VXLAN is used instead of MPLS. In other words, in case of spine failure convergence for traffic toward the BMS is affected and subject to BGP hold-time expiration: the vrouter receives BMS MAC/IP EVPN routes (Type 2 and Type 1 AD) from both spine switches. If the spine switch fails, routes from the faulty spine are kept in the RIB until the MP-iBGP session expires (BGP hold-time). During this period, the traffic toward the BMS is blackholed as it is encapsulated in VXLAN to the faulty Spine VTEP. In this way, coupling a BMS to the spine affects convergence time for traffic toward the BMS.

Figure 16:
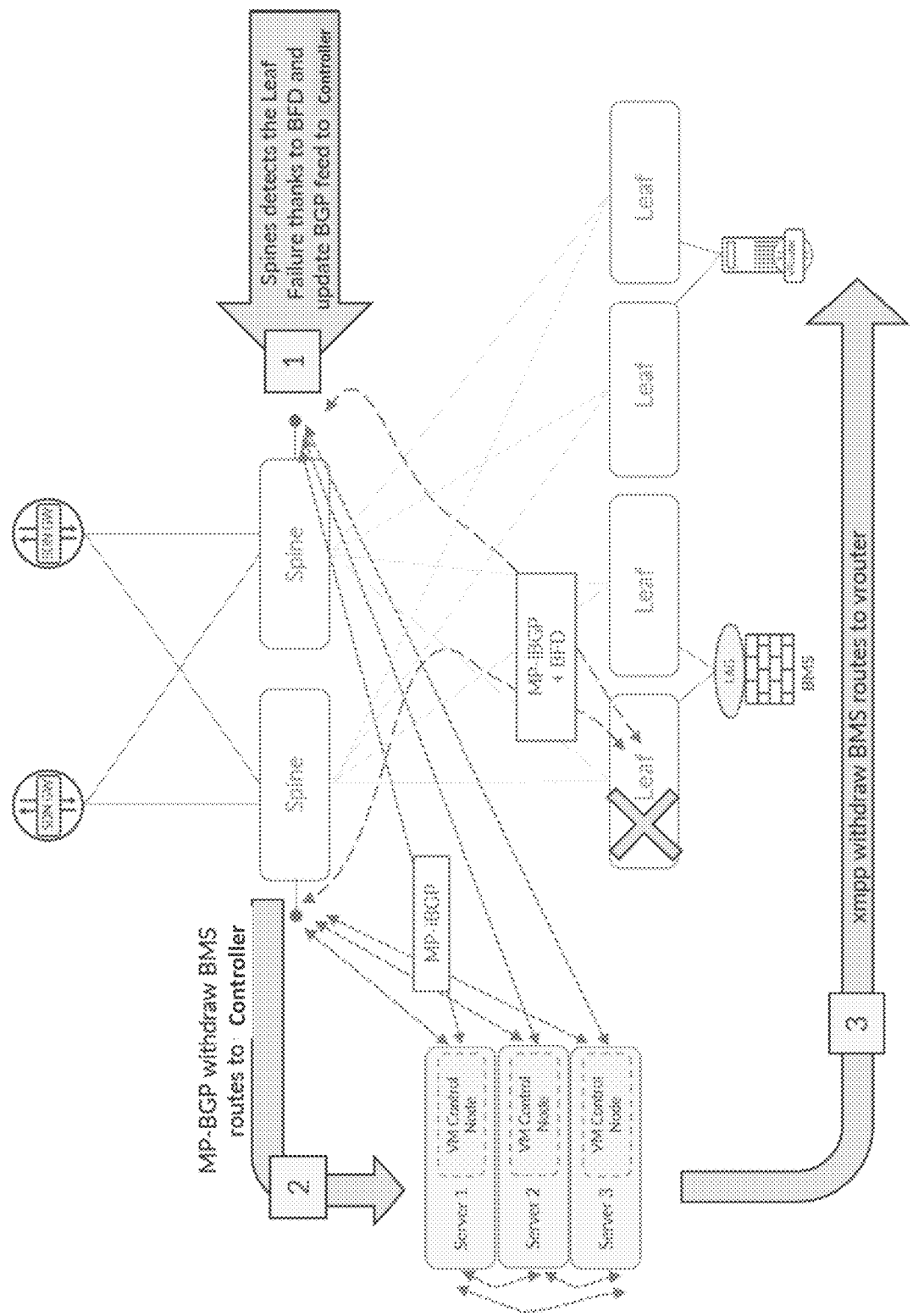
FIG. 16 is a conceptual diagram illustrating a system in which bare metal servers are connected on dedicated leaf switches.

FIG. 16 is a conceptual diagram illustrating a system in which bare metal servers are connected on dedicated leaf switches. That is, bare metal servers connect to leaf switches that are designated for only BMS connections, and no vrouter connections. The failure of a Spine is harmless because the BGP routing is redundant and no Tunnel Endpoint is affected.

The failure of the Leaf switch that connects the BMS results in the following actions, depicted by numbered blocks in FIG. 16. 1. Spine detects Leaf failure due to the Leaf-Spine NIP-iBGP/BFD session (overlay). 2. Spine advertises the faulty Leaf EVPN routes. 3. The Control Nodes update vrouters by removing paths via the faulty Leaf switch.

An approach for High Throughput BMS on Spine switches is as follows: In some cases, CAPEX optimization may require placing a High Throughput PNF on Spine switches. The principles of this design are the following: Control Node to peer with Spine switch for L3 address family (VPNv6/VPNv4/Route Target). Control Node to peer with a dedicated leaf switch for family EVPN (e.g., the one that connects Servers Hosting the control nodes). This requires a careful definition of an extra level of Route Reflection at Leaf switch level. No other BMS must be connected to these Leaf switches. Dual Homed Vrouters can be connected at this pair of Leaf Switches.

Figure 17:
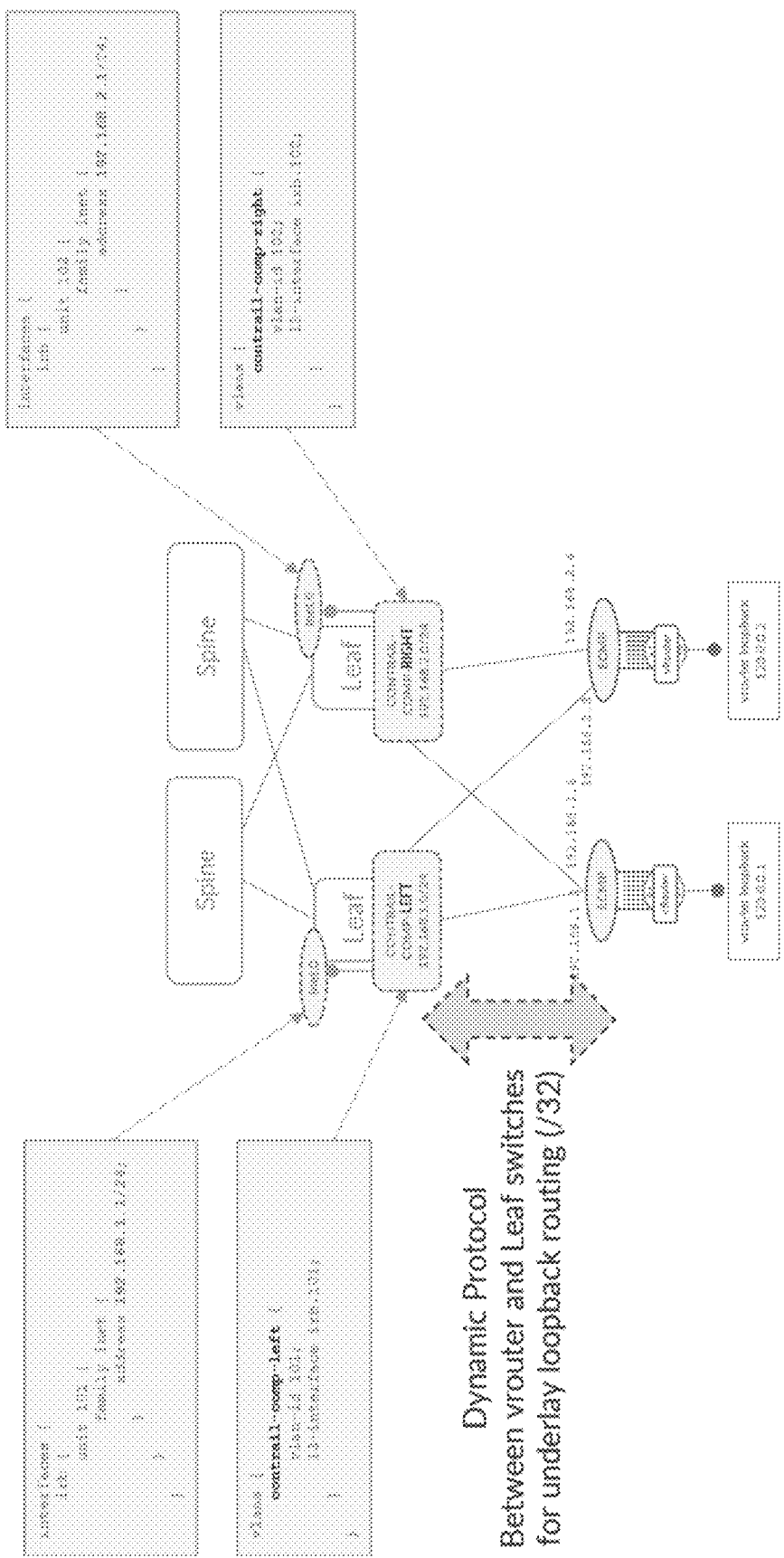
FIG. 17 is a conceptual diagram illustrating a logical representation of an example virtual router to leaf switch ECMP attachment using Integrated Routing and Bridging (IRB) integration, according to aspects of this disclosure.

FIG. 17 is a conceptual diagram illustrating a logical representation of an example virtual router to leaf switch ECMP attachment using Integrated Routing and Bridging (IRB) integration, according to aspects of this disclosure. This illustrates an example approach for vrouter fast convergence is tied to a closer IP Fabric integration, specifically, compute Layer 3 Fabric integration over ECMP (dynamic), which has the following features: L3 integration by doing away with LAG connectivity and instead use ECMP at vrouter; and a dynamic routing protocol between Leaf and vrouter. One approach is routing protocol process (e.g., RPD) integration within compute nodes on top of vrouter-agent so that the vrouter agent can directly interact with the fabric. The introduction of routing daemon integration generates more complexity at link subnet provisioning: In Bridge Domain/IRB mode, Leaf switches must be identified in Odd/Even fashion with different provisioning: Left Subnet and IRB interface vs Right Subnets and IRB. Point-to-point link mode (typically /30) may be defined instead of Bridge Domains, but this option generates also more complexity in terms of provisioning. Some possibilities for this include IPv6 link local or unnumbered IP interfaces.

According to an IRB model, the VLANs CONTRAIL-COMP-LEFT (192.168.1.0/24) and CONTRAIL-COMP-RIGHT (192.168.2.0/24) connect compute nodes at leaf switches for each ECMP member link. IRB interfaces on each compute node are acting to simplify.

Dynamic Routing occurs between leaf switch and vrouter to synchronize underlay routing. That is, the leaf switch and the vrouter exchange routing protocol messages, including the compute node advertising an underlay network route of its loopback address to the leaf switch by the routing protocol session. The routing protocol used for dynamic routing must match with the Fabric protocol. That is, if BGP is the routing protocol used within the IP fabric between nodes of the IP fabric, then BGP must also be the routing protocol used between the leaf switch and the vrouter. However, a different routing protocol other than BGP may alternatively be used for both, such as RIFT or ISIS. In some examples, the dynamic routing between the leaf switch and vrouter may employ containerized routing protocol process (cRPD) as opposed to extracting the Control Node BGP code.

Figure 18:
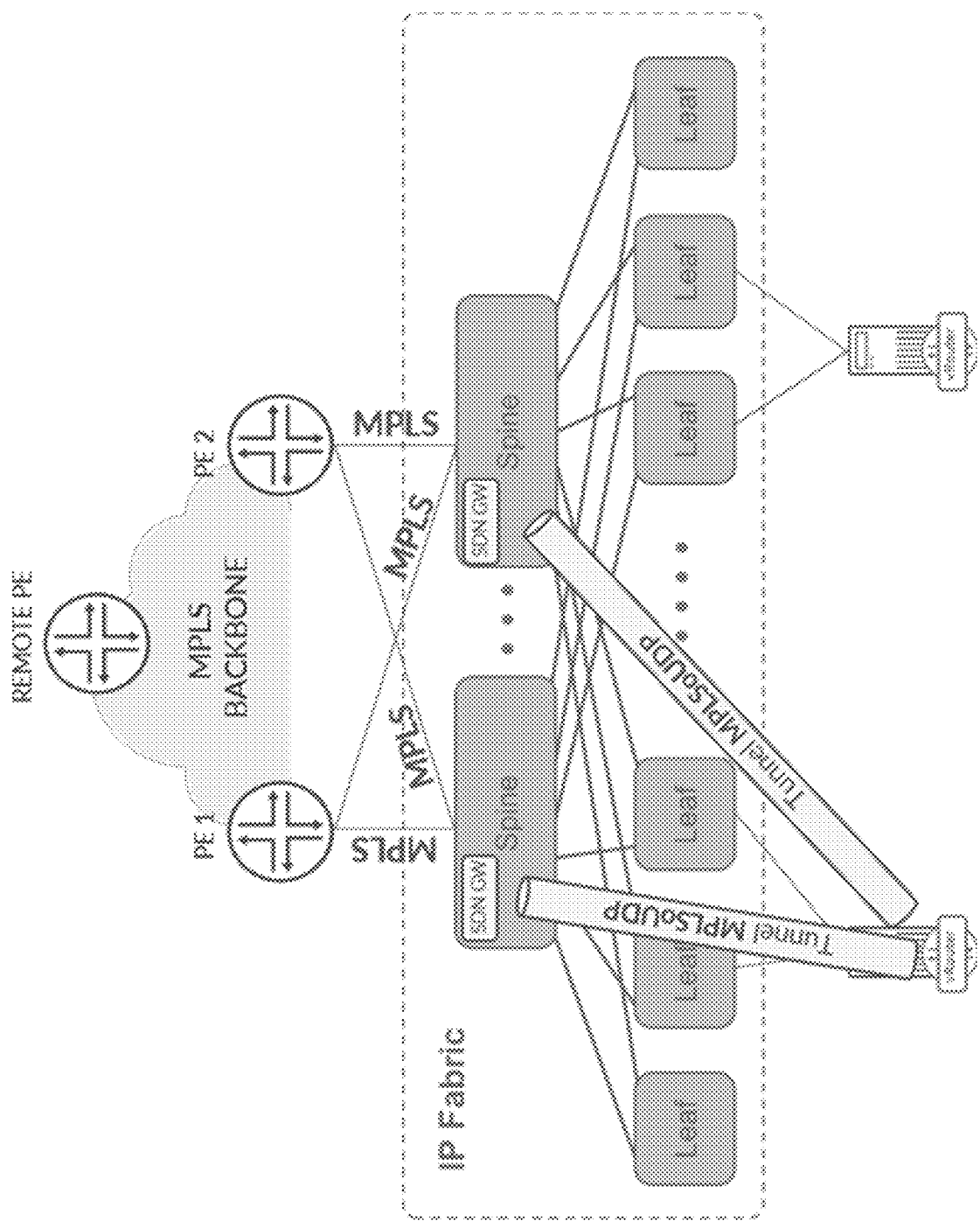
FIG. 18 is a conceptual diagram illustrating a network design in which the SDN gateway function is collapsed together with the spine function of the IP fabric.

FIG. 18 is a conceptual diagram illustrating a network design in which the SDN gateway function is collapsed together with the spine function of the IP fabric. That is, a single network device provides both the SDN gateway function and the spine switch function. FIG. 18 illustrates a forwarding overview of the collapsed gateway/Fabric Design. Although this design is not the reference design defined in earlier sections, the following considers certain issues that arise in a collapsed design. In this case, an MPLSoUDP-capable spine is introduced.

Figure 19:
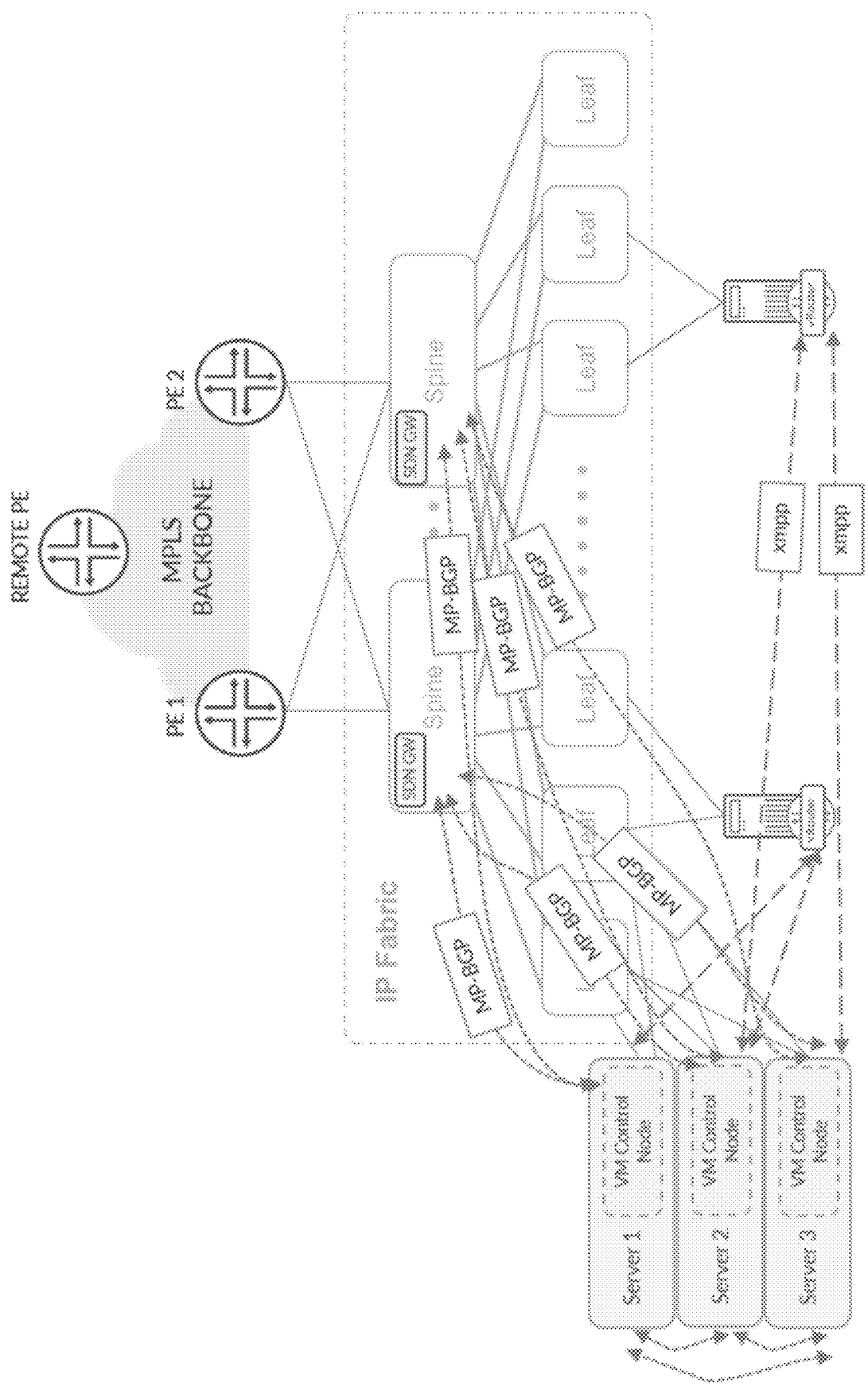
FIG. 19 is a conceptual diagram illustrating an example signaling overview of the collapsed SDN gateway/IP Fabric Design network design in which the SDN gateway function is collapsed together with the spine function of the IP fabric.

FIG. 19 is a conceptual diagram illustrating an example signaling overview of the collapsed SDN gateway/IP Fabric Design network design in which the SDN gateway function is collapsed together with the spine function of the IP fabric. In this example, MP-BGP sessions run between the SDN gateway/spine switch and each control node VM of the SDN controller. The MP-BGP sessions may be used to communicate underlay network routes propagated through the IP fabric, as described herein.

Certain aspects of this disclosure address improving the detection time in case of underlay node failure. Indeed, a cornerstone of fast convergence is the ability to rapidly detect a node failure. However, after detection, updating forwarding information at the data plane level can be time consuming, especially when the number of routes increases. Hence, it is possible that despite a rapid detection framework, the sub-second objective of fast convergence may not be met. To provide a scalable way to update forwarding information at the data plane after detection of a failure, this disclosure provides techniques for prefix-independent convergence at the virtual router for local repair. In some examples, this may be implemented in conjunction with the techniques described above, such that the local repair with prefix-independent convergence is performed by a virtual router in response to detecting the underlay node failure as discussed above. In other examples, the techniques for local repair with prefix-independent convergence described in the following section may be implemented independent of the techniques described above, such as in other situations, contexts, or use cases.

Figure 20A:
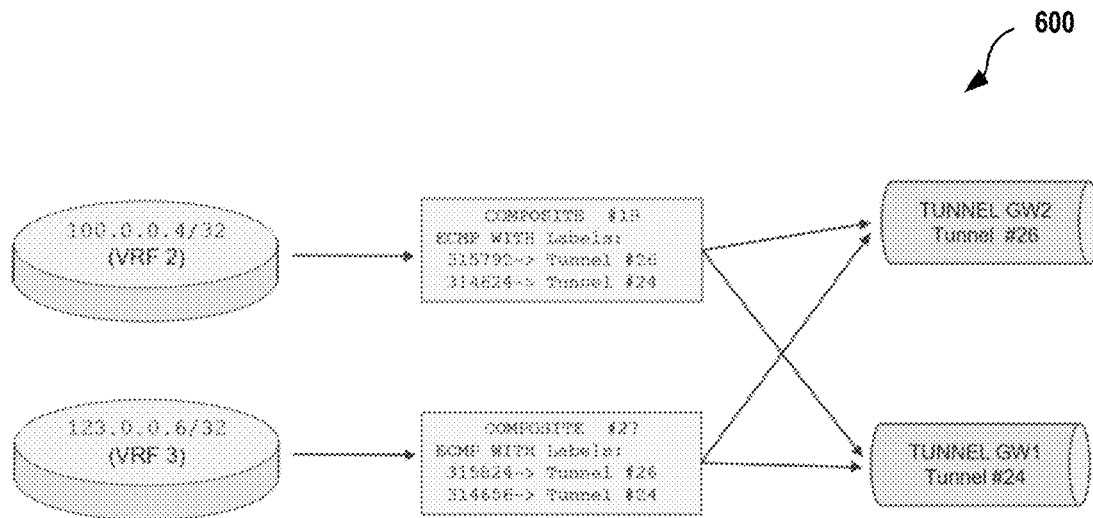
FIGS. 20A-20B are conceptual diagrams illustrating a forwarding information base (FIB) structure of a virtual router having a linear convergence time dependency upon the number of prefixes.
Figure 20B:
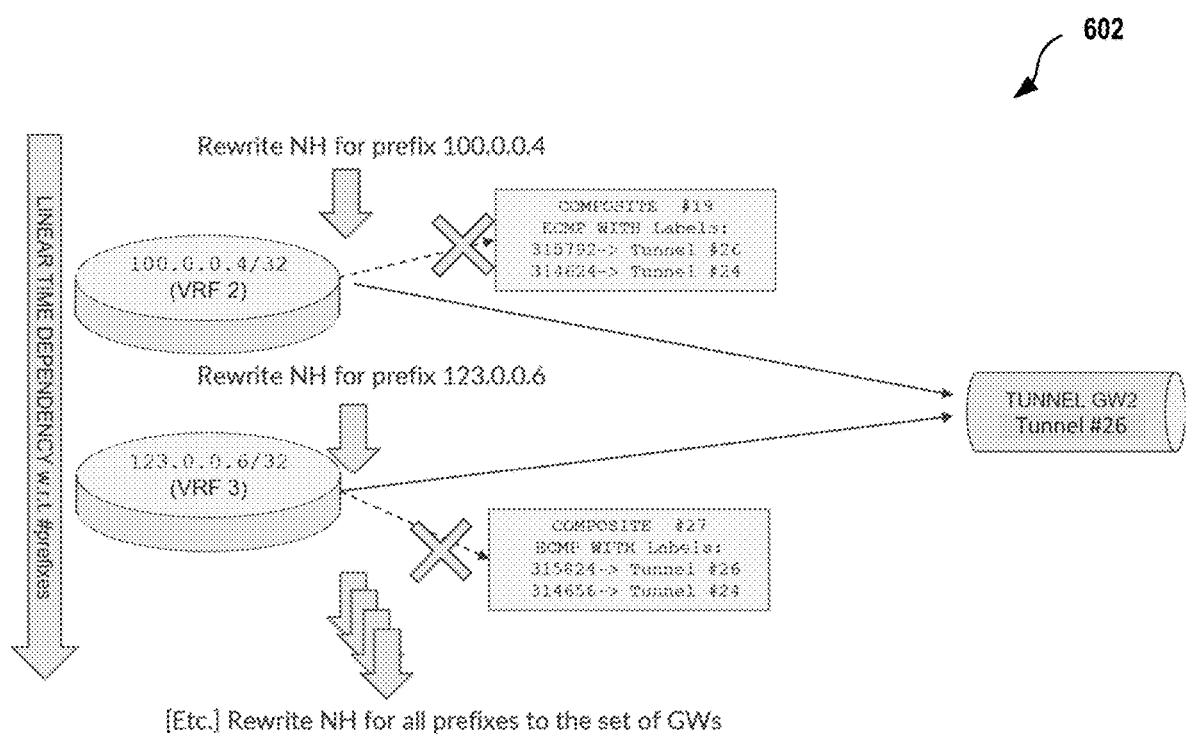

FIGS. 20A-20B are conceptual diagrams illustrating a forwarding information base (FIB) structure of a virtual router having a linear convergence time dependency upon the number of prefixes. FIG. 20A shows the FIB structure 600 before a failure of one of the gateways, and FIG. 2B shows the FIB 602 after the failure of "GW1" on tunnel #24, with only GW2 reachable by tunnel #26. This is one example of how the FIB could be structured in the absence of the techniques for local repair with prefix-independent convergence. This may be the case with some virtual router FIB structures that generate a linear convergence time dependency with respect to the number of prefixes (more precisely, labels and next hop tuples). In high scaling scenarios the SDN gateway failure and the compute node failure are affected by the linear convergence time dependency.

In some examples, FIB update speed for such a virtual router is approximately 10K prefixes per second. If, for example 50K VPNv4 prefixes with unique labels are received from the SDN Gateways, the FIB update processing lasts 5 seconds, which misses the sub-second objective. To illustrate the problem, an example is depicted in FIG. 20A, having two routes received at a vrouter from a set of Gateways (GW1 and GW2). First route: 100.0.0.4/32 in VRF 2. Second route: 123.0.0.6/32 in VRF 3.

The following applies to cases where virtual router must handle the failure of an ECMP member, such as SDN gateway failure case and the vrouter failure sub-case of ECMP 3 (vrouter load balances traffic to two vrouters). These routes must be load balanced at the virtual router toward both gateways with their respective MPLS Labels received from the gateways (MPLS Label and UDP/IP Tunnel). A high-level view of this requirement is represented with multipath/ECMP paths from a virtual router on tunnels to SDN gateway devices.

In some implementations of the FIB of the virtual router, the structure of the Composite Next-Hop together with its component NH (child) may be such that labels are hosted in the Composite (ECMP) next-hop, as shown in FIG. 20A.

Hence, one ECMP must be defined per MPLS service path (set of labels from both gateways). Tunnel Next-Hops (here, the SDN Gateways) are reused for all prefixes forwarded to the same Tunnel Endpoint.

In the case of SDN gateway failure (or in the reverse case, with a vrouter failure) this is ultimately a FIB rewrite operation from an ECMP NH to unicast NH. In case of a Gateway Failure (same example as in previous section), the following sequence of action happens: 1. The Control Node detects that the Gateway is down. Detection of the gateway failure may be detected as described above with respect to FIGS. 1-12, in some examples. 2. The Control Node updates its underlay routing information and overlay routing information, and publishes an XMPP update with new Next Hop information. The faulty Tunnel Endpoint is removed from the list of Next-Hops. 3. The vrouter-agent receiving the XMPP update, and in turn updates its forwarding information by rewriting Next-Hop information for each prefix: the initial ECMP composite Next-Hop is replaced by a Tunnel Next-Hop (if there is only one NH left) or by another composite made up of all active Next Hops. The time requested to complete this operation is a linear function of the number of prefixes, as each of these prefixes needs Next-Hop rewriting, as shown in FIG. 20B. XMPP Update from Control Node to vrouter agent with Single Next-Hop (before failure, a list of NHs with both Gateways Next-Hops was sent). FIB state after convergence is shown in FIG. 20B: the Next-Hop of each entry is rewritten to point to the Tunnel Next-Hop, Tunnel GW2 for tunnel #26. The sequence of Next-Hop rewrite actions introduces additional convergence time at vrouter-agent level. This is roughly taking 1 second for 10K prefixes.

The techniques described in the previous section provide a framework to propagate the status of all Tunnel Endpoints to the virtual router, to detect failures of tunnel endpoints as nodes of the underlay network. The tunnel endpoints in the examples described above may be SDN controllers or virtual router, for example. In the example of a gateway failure, the Control Node detects that the Gateway is down. The control node may detect this by receiving notification from the IP fabric, as described above with respect to FIGS. 1-8, in some examples. This section proposes to leverage the status of the remote Tunnel Endpoint at the virtual router level to further improve the convergence time. This section provides techniques to enforce a "local repair" functionality within the virtual router so broken paths can be removed from the forwarding path of the forwarding information.

Figure 21A:
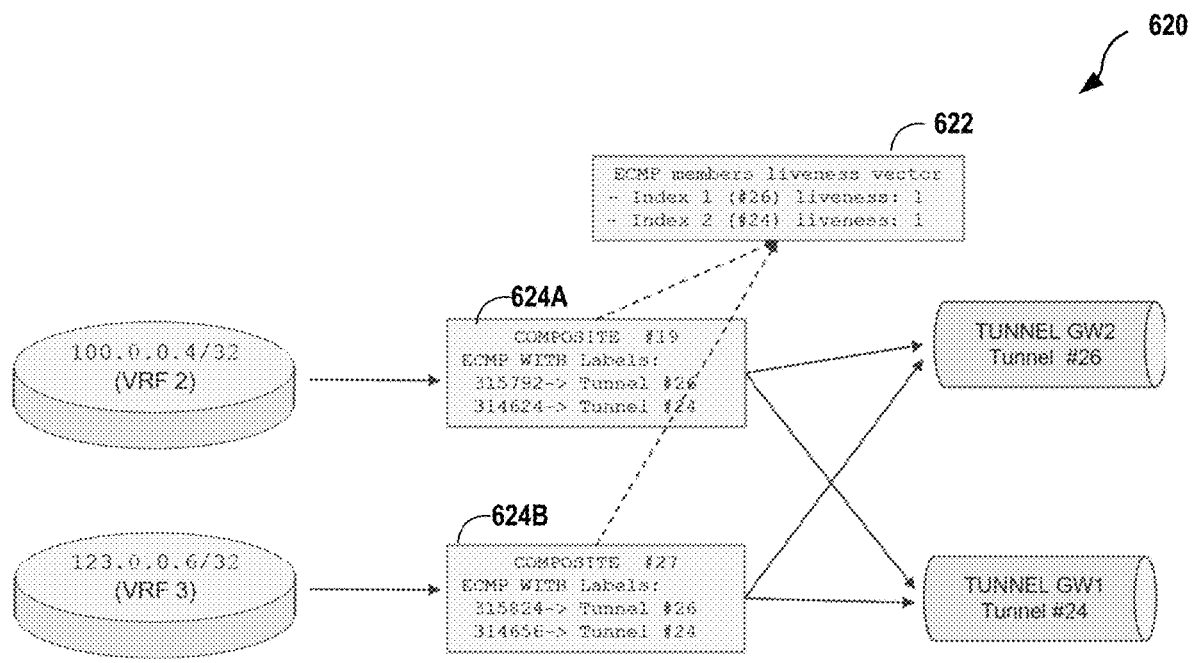
FIGS. 21A-21B are conceptual diagrams illustrating an example forwarding structure for a composite next hop in a forwarding information base, in accordance with aspects of the techniques of this disclosure.
Figure 21B:
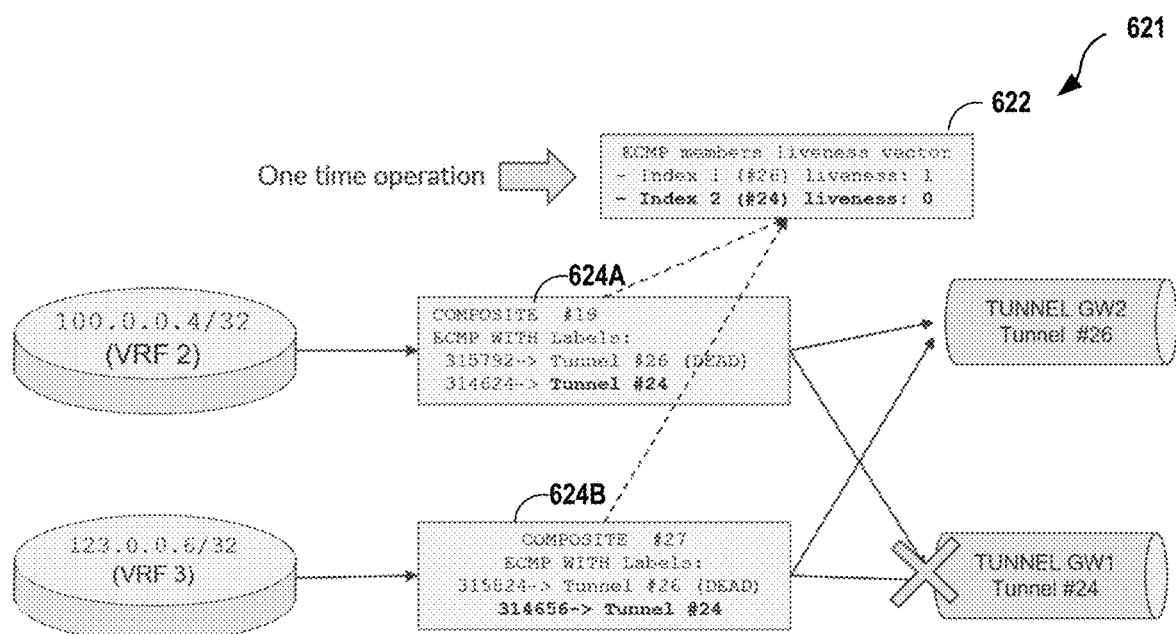

FIGS. 21A-21B are conceptual diagrams illustrating an example forwarding structures for a composite next hop in a forwarding information base, in accordance with aspects of the techniques of this disclosure. FIG. 21A shows the FIB 620 before a failure of one of the gateways, and FIG. 21B shows the FIB 621 after the failure of "GW1" on tunnel #24, with only GW2 reachable by tunnel #26. In some examples, forwarding structure 600 may be part of one or more of FIBs 94A-94C of FIG. 5B. This structure includes a shared ECMP member liveness vector 622 that indicates the liveness state of ECMP members in an orthogonal manner. In the example of FIGS. 21A-21B the ECMP member liveness vector 622 is orthogonal to the forwarding path. The shared ECMP member liveness vector 622 is created once for all Composite ECMP Next Hops that share a common list of overlay network tunnel endpoint Next-Hops. In this example, a common vector is defined for both 100.0.0.4/32 and 123.0.0.6/32 prefixes, for the Composite ECMP Next Hops 624A-624B in this example. As shown in FIG. 21B, upon failure of one of the tunnel next hops, only the shared liveness vector 622 needs to be updated to reflect that tunnel #22 has liveness status "0" (not live), while tunnel #24 remains with liveness status "1" (live). Composite next hops 624A and 624B do not need to be rewritten after the failure detection, in contrast to the FIB structure of FIGS. 20A-20B.

At forwarding level, extra logic is implemented at the vrouter agent 84 of FIG. 5B so that the hash would exclude these Component Next-Hops in case of failure (i.e., liveness [member]=false). After the vrouter agent 84 is notified of the failure of an SDN Gateway, the dead child is excluded from the hashing bucket of tunnel endpoint next hops. This new forwarding logic is an intermediate step that takes during the Next-Hop rewrite operations (linear time dependency). In fast convergence semantics, this is a "local repair" framework (i.e., updated vrouter forwarding state) in comparison with the default "global repair" framework, which is the rewrite action in line with the Control Node FIB update.

The FIB structures of FIGS. 21A-21B use an orthogonal liveness vector, in contrast to having MPLS labels embedded within the composite next hop together with the ECMP child NH, as in FIGS. 20A-20B. In some examples, rather than using an orthogonal vector, the liveness vector could be implemented in line with the forwarding path, rather than orthogonally, as long as the association between the label and the corresponding tunnel is not lost when the forwarding is decomposed into another level of indirection to account for the liveness.

This liveness vector feature may be particularly useful when there are a lot of advertised routes, such as in the context of an SDN gateway, which advertises many routes to the compute nodes. The end to end workflow in case of a virtual router detecting failure of another virtual router at a different compute node may be similar to that described above with respect to the gateway failure. Some level of pre-family prioritization may be implemented at Control Node, in some examples.

This framework described so far assumes an ECMP case. However, in many cases network designs rely on Primary/Backup routing: For virtual router to virtual router, Primary/Backup routing may be used. For virtual router to Gateways, Primary/Backup routing is less likely to happen as usually the architecture relies on ECMP. Notwithstanding, a similar logic can be implemented for a primary/backup scenario (non-ECMP). Control Node to send weighted Next-Hops to virtual router agents (best/second best routes). Similar to the ECMP case described above, the vrouter-agent would craft weighted Composite ECMP Next-Hops instead of Composite ECMP Next-Hops together with the liveness vector so as to pre-load backup path in the forwarding plane. Only the lowest weight is selected for forwarding. In some examples, weighting information may be incorporated in the liveness vector as well.

In this manner, this approach includes storing, by a virtual router agent of a compute node managed by a SDN controller, a forwarding information data structure with a shared liveness vector that is orthogonal to the forwarding path to indicate a liveness state of a plurality of overlay network tunnel endpoint next hops, wherein the shared liveness vector is shared by each of a plurality of members for a plurality of composite next hops that share a common list of the plurality of overlay network tunnel endpoint next hops, and in response to determining, by the virtual router agent, that the orthogonal liveness vector indicates that each of the plurality of overlay network tunnel endpoint next hops are reachable, distributing network traffic to one or more of the plurality of overlay network tunnel endpoint next hops.

Below is an example in which a /32 address is advertised with two next hops, in which weighted next hops are used for active/standby. In this example, before failure, 100.0.0.4/32 is advertised with two next hops.

```
<message from="network-control@contrailsystems.com"
to="comp-pop1-1.local/bgp-peer">
    <event xmlns="http://jabber.org/protocol/pubsub">
        <items node="1/1/default-domain:admin:vn-pop1:vn-pop1">
                <item id="100.0.0.4/32">
            <entry>
                <nlri>
                    <af>1</af>
                    <safi>1</safi>
                    <address>100.0.0.4/32</address>
                </nlri>
                <next-hops>
                    <next-hop>
                        <af>1</af>
                        <address>192.168.101.111</address>
                        <mac></mac>
                        <label>314624</label>
                        <vni>0</vni>
                    <weight>0</weight>
                        <tunnel-encapsulation-list>
                        <tunnel-encapsulation>
                        udp</tunnel-encapsulation>
                        </tunnel-encapsulation-list>
                        <virtual-network>
                            Default-domain:admin:vn-dc
                        </virtual-network>
                        <tag-list />
                    </next-hop>
                    <next-hop>
                        <af>1</af>
                        <address>192.168.101.112</address>
                        <mac></mac>
                        <label>315792</label>
                        <vni>0</vni>
                        <weight>100</weight>
                        <tunnel-encapsulation-list>
                        <tunnel-encapsulation>
                        udp</tunnel-encapsulation>
                        </tunnel-encapsulation-list>
                        <virtual-network>
                            Default-domain:admin:vn-dc
                        </virtual-network>
                        <tag-list />
                    </next-hop>
                </next-hops>
                <version>1</version>
<virtual-network>default-domain:admin:vn-dc</virtual-network>
                <mobility seqno="1" sticky="false" />
                <sequence-number>1</sequence-number>
                <security-group-list>
                        <security-group>8000010<
                        /security-group>
                </security-group-list>
                <community-tag-list />
                <local-preference>200</local-preference>
                <med>100</med>
                <load-balance>
                        <load-balance-fields />
<load-balance-decision>field-hash</load-balance-decision>
                </load-balance>
                <sub-protocol>interface</sub-protocol>
            </entry>
        </item>
    </items>
</event>
</message>
```

Figure 22:
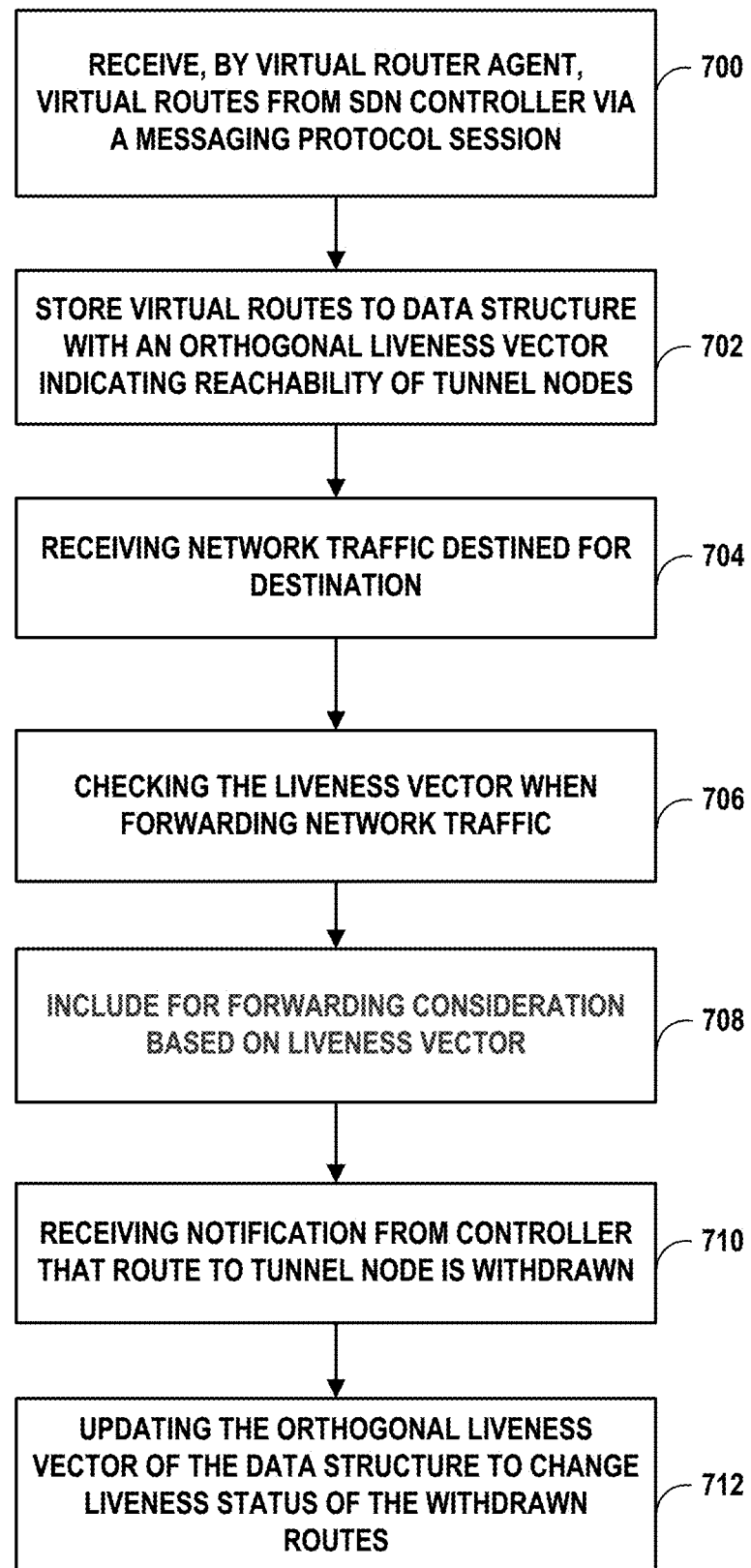
FIG. 22 is a flowchart illustrating example operation of network devices in accordance with the techniques of this disclosure.

FIG. 22 is a flowchart illustrating example operation of network devices in accordance with the techniques of this disclosure. FIG. 22 will be described with reference to FIGS. 1-5 for purposes of example. A virtual router agent (e.g., VR agents 36, 84) managed by an SDN controller such as SDN controller 32 receives overlay network routes from the SDN controller via a messaging protocol session (700), such as an XMPP session. The virtual router agent stores the overlay network routes to a data structure, such as a forwarding information base (702) maintained in a forwarding plane of a compute node on which the virtual router agent executes. The forwarding information base is a forwarding information data structure with a shared liveness vector orthogonal to the forwarding path to indicate a liveness state of a plurality of overlay network tunnel endpoint next hops, wherein the shared liveness vector is shared by each of a plurality of members for a plurality of composite next hops that share a common list of overlay network tunnel endpoint next hops, such as the example illustrated in FIG. 21A.

The compute node receives network traffic destined for a destination reachable by an overlay network tunnel endpoint (704). The overlay network tunnel endpoint may be an SDN gateway 8, or another virtual router of a different compute node, for example. The virtual agent checks the liveness vector when forwarding the network traffic according to the forwarding information (706). In response to determining, by the virtual router agent, that the orthogonal liveness vector indicates that each of the plurality of overlay network tunnel endpoint next hops are reachable, the compute node includes those tunnel endpoint next hops that are indicated "live," or reachable, by the orthogonal liveness vector for forwarding consideration, and distributes network traffic to one or more of the plurality of overlay network tunnel endpoint next hops (708). A network tunnel endpoint may be selected by load balancing (e.g., hashing) in an ECMP scenario, or by sending to a primary based on weightings, in a primary/backup scenario.

In response to receiving, by the virtual router and from a Software Defined Networking (SDN) controller, an indication that one of the plurality of overlay network tunnel endpoint next hops is an unreachable tunnel endpoint next hop, e.g., by receiving an overlay route withdrawal (710), the virtual router agent updates the orthogonal liveness vector to reflect the unreachable status of the unreachable tunnel endpoint next hop (712), which results in the virtual routing agent thereafter excluding the unreachable tunnel endpoint next hop from the set of tunnel endpoint next hops over which network traffic is distributed.

In this manner, forwarding information includes a shared liveness vector that indicates the liveness state of next hops in an orthogonal manner. The shared liveness vector is orthogonal to the forwarding path of the forwarding information. The shared liveness vector is created once for all composite next hops that share a common list of next hops. At the forwarding level, logic is implemented at the virtual router agent so that the hash would exclude these component next hops in case of failure. The shared liveness vector may be used for an ECNIP composite next hop, or for a primary/backup scenario.

Example 1. A method comprising: determining, by a Software Defined Networking (SDN) controller that manages an overlay network and based on whether an underlay network route is stored for a destination in an underlay network, whether a next hop for a corresponding overlay network route for the destination is reachable by the SDN controller, the underlay network route comprising a route advertised by a node in an Internet Protocol (IP) fabric of the underlay network; and in response to determining the next hop for the overlay network route is unreachable, refraining from advertising, by the SDN controller, the overlay network route and withdrawing the overlay network route from any network peers to which the overlay network route was previously advertised.

Example 2. The method of example 1, wherein determining whether the next hop for the corresponding overlay route is reachable by the SDN controller comprises determining whether the underlay route is stored in underlay routing information maintained by the SDN controller, wherein the underlay routing information stores routes advertised to the SDN controller by the IP fabric of the underlay network.

Example 3. The method of example 1, wherein the node in the IP fabric comprises a spine switch, the method further comprising: receiving, by the SDN controller and via a Border Gateway Protocol session between the SDN controller and the spine switch, a plurality of underlay network routes to active tunnel endpoints of the underlay network, wherein the underlay network route comprises one of the plurality of underlay network routes, wherein the active tunnel endpoints comprise tunnel endpoints indicated as reachable based on a fault detection protocol session between the active tunnel endpoints and a leaf node of the IP fabric.

Example 4. The method of example 3, wherein the fault detection protocol session comprises a Bidirectional Forwarding Detection (BFD) protocol session.

Example 5. The method of example 1, further comprising, by the SDN controller and prior to determining the next hop for the overlay network is unreachable: receiving the underlay network route advertised from the node in the IP fabric of the underlay network; in response to receiving the underlay network route: determining that the next hop for the corresponding overlay network route is reachable; marking the corresponding overlay network route as reachable; advertising the overlay network route to one or more compute nodes and SDN gateway devices; and advertising the underlay network route to the one or more compute nodes and SDN gateway devices.

Example 6. The method of example 1, further comprising: receiving, by the SDN controller, a message from the node in the IP fabric indicating the underlay network route is withdrawn because the destination is unreachable by the IP fabric; updating, by the SDN controller, stored underlay routing information to remove the underlay network route that is withdrawn; updating, by the SDN controller, stored overlay routing information to remove the overlay network route and any other overlay network routes dependent upon the underlay network route, wherein determining whether the next hop for the corresponding overlay network route is reachable by the SDN controller comprises determining the next hop is not reachable because the underlay network route has been removed, and wherein withdrawing the overlay network route comprises: sending, via a messaging protocol and to one or more compute nodes, a message withdrawing the overlay network route and any other overlay network routes dependent upon the underlay network route; and sending, via a routing protocol and to one or more SDN gateway devices, a message withdrawing the overlay network route and any other overlay network routes dependent upon the underlay network route.

Example 7. The method of example 6, further comprising, by the SDN controller and in response to updating the stored underlay routing information to remove the underlay network route that is withdrawn: sending, via a messaging protocol and to one or more compute nodes, a message withdrawing the underlay network route; and sending, via a routing protocol and to one or more SDN gateway devices, a message withdrawing the underlay network route.

Example 8. The method of example 1, further comprising: determining, by a leaf switch of the IP fabric and via a fault detection protocol session established between the leaf switch and a compute node of the underlay network, that the compute node is not responding on the fault detection protocol session; and propagating, by the leaf switch and in response to the determining, a route withdrawal message through the IP fabric withdrawing an underlay network route for the compute node, wherein receiving the message from the node in the IP fabric indicating the underlay network route is withdrawn comprises receiving the message from a spine switch, wherein the spine switch received a corresponding message based on the propagating.

Example 9. The method of example 1, wherein the destination for the underlay network route comprises a host address for a virtual router managed by the SDN controller, and wherein the corresponding overlay network route for the destination comprises a virtual private network (VPN) overlay network route advertised by the virtual router.

Example 10. A method comprising: advertising, by a compute node managed by a Software Defined Networking (SDN) controller, a virtual router of the compute node as a next hop for an overlay network virtual private network (VPN) route; establishing, by the compute node, a fault detection protocol session between the virtual router and a leaf switch of an Internet Protocol (IP) fabric of an underlay network to communicate a reachability status of the virtual router to the leaf switch; and receiving, by the compute node, traffic destined for the overlay network VPN route only when the fault detection protocol session indicates to the leaf switch of the IP fabric that the virtual router is reachable.

Example 11. The method of example 10, further comprising: advertising, by the compute node and to the leaf switch via a Border Gateway Protocol (BGP) session between the compute node and the leaf switch, an underlay network route to the virtual router.

Example 12. The method of example 11, wherein establishing the fault detection protocol session comprises establishing a Bidirectional Forwarding Detection session associated with the BGP session between the compute node and the leaf switch.

Example 13. The method of example 12, further comprising: receiving, by the compute node operating as a messaging protocol client over a messaging protocol session between the SDN controller and the compute node, a plurality of overlay network VPN routes to other virtual routers on other compute nodes managed by the SDN controller; and receiving, by the compute node operating as the messaging protocol client, a message withdrawing one of the plurality of overlay network VPN routes in response to the SDN controller receiving from a spine switch in the IP fabric a message withdrawing a corresponding underlay network route to one of the other virtual routers.

Example 14. The method of example 13, further comprising: in response to receiving the message withdrawing the one of one of the plurality of overlay network VPN routes to other virtual routers, updating an orthogonal liveness vector independent of a number of prefixes that the withdrawal impacts.

Example 15. The method of example 10, wherein advertising the virtual router as the next hop for an overlay network VPN route comprises advertising the overlay VPN route to the SDN controller as a messaging protocol client of the compute node operating as a messaging protocol server, wherein the overlay network VPN route comprises a virtual route to a virtual interface.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, process or components may be implemented together or separately as discrete but interoperable logic devices. Depiction of different features as process or units is intended to highlight different functional aspects and does not necessarily imply that such process or units must be realized by separate hardware or software components. Rather, functionality associated with one or more process or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various aspects of this disclosure have been described. These and other aspects are within the scope of the following claims.

The invention claimed is:

1. A method comprising:

storing, by a Software Defined Networking (SDN) controller, an underlay routing table having a set of underlay network routes for an underlay network of a data center, wherein the underlay network includes a plurality of physical network switches that form an Internet Protocol (IP) fabric and a set of virtual routers executing on respective compute nodes of the data center;

storing, by the SDN controller, an overlay routing table having a set of virtual private network (VPN) routes for at least one virtual network of an overlay network for the data center, the at least one virtual network provided by one of the set of virtual routers;

receiving, by the SDN controller and from one of the plurality of physical network switches of the IP fabric that peers with the SDN controller by a routing protocol session, an underlay network route to a destination address assigned to a particular one of the virtual routers;

installing, by the SDN controller and within the underlay routing table of the SDN controller, the received underlay network route as an indicator of a reachability status in the underlay network from another one of the plurality of physical network switches to the particular one of the virtual routers;

prior to advertising a VPN route for the at least one virtual network, performing a next hop reachability check to determine whether a corresponding underlay network route for the VPN route exists in the underlay routing table; and controlling, by the SDN controller and based on a presence or absence of the underlay network route within the underlay routing table to the particular one of the virtual routers, advertisement of one or more of the VPN routes for the at least one virtual network of the overlay network.

2. The method of claim 1, wherein controlling advertisement of the one or more of the VPN routes comprises withdrawing one or more of the VPN routes for the at least one virtual network of the overlay network when the underlay network route is removed from the routing table of the underlay network in response to detection of reachability failure to the particular one of the virtual routers.

3. The method of claim 2, wherein withdrawing the one or more VPN routes comprises:

sending, via a messaging protocol and to one or more compute nodes, a message withdrawing the one or more VPN routes for the at least one virtual network and any other VPN routes dependent upon the underlay network route to the destination address assigned to the particular one of the virtual routers; and sending, via a routing protocol and to one or more SDN gateway devices, a message withdrawing the one or more VPN routes and any other VPN routes dependent upon the underlay network route to the destination address assigned to the particular one of the virtual routers.

4. The method of claim 1, wherein controlling advertisement of the one or more of the VPN routes comprises advertising one or more of the VPN routes for the at least one virtual network of the overlay network when the underlay network route is installed within the underlay routing table.

5. The method of claim 1, wherein controlling advertisement of the one or more of the VPN routes comprises determining, by the SDN controller, whether a next hop for a corresponding VPN route associated with the destination address is reachable by the SDN controller, wherein the VPN route comprises a VPN route of the overlay routing table; and in response to determining the next hop for the VPN route is unreachable, refraining from advertising, by the SDN controller, the VPN route and withdrawing the VPN route from any network peers to which the VPN route was previously advertised.

6. The method of claim 1, wherein the one of the plurality of physical network switches of the underlay network that peers with the SDN controller comprises a spine switch of the IP fabric of the underlay network, and wherein the routing protocol session comprises a Border Gateway Protocol session, the method further comprising:

wherein receiving the underlay network route comprises receiving, by the SDN controller and via the Border Gateway Protocol session between the SDN controller and the spine switch, a plurality of underlay network routes to active tunnel endpoints of the underlay network, wherein storing the underlay routing table comprises storing the plurality of underlay network routes to the underlay routing table, and wherein the active tunnel endpoints comprise tunnel endpoints indicated as reachable based on a fault detection protocol session between the active tunnel endpoints and a leaf node of the IP fabric.

7. The method of claim 6, wherein the fault detection protocol session comprises a Bidirectional Forwarding Detection (BFD) protocol session.

8. The method of claim 1, further comprising, by the SDN controller and in response to updating the underlay routing table to remove an underlay network route that is withdrawn:

sending, via a messaging protocol and to one or more compute nodes, a message withdrawing the underlay network route that is withdrawn; and sending, via a routing protocol and to one or more SDN gateway devices, a message withdrawing the underlay network route that is withdrawn.

9. The method of claim 1, wherein the destination address assigned to a particular one of the virtual routers comprises a host address for the particular one of the virtual routers, and wherein the one or more of the VPN routes for the at least one virtual network comprises an overlay network route for the destination address comprising a VPN route for the destination address advertised by the virtual router.

10. A Software Defined Networking (SDN) controller comprising:

processing circuitry in communication with a memory, the processing circuitry being configured to:

store an underlay routing table having a set of underlay network routes for an underlay network of a data center, wherein the underlay network includes a plurality of physical network switches that form an Internet Protocol (IP) fabric, gateway routers, and a set of virtual routers executing on respective compute nodes of the data center;

store an overlay routing table having a set of virtual private network (VPN) routes for at least one virtual network of an overlay network for the data center, the at least one virtual network provided by one of the set of virtual routers;

receive, from one of the plurality of physical network switches of the IP fabric that peers with the SDN controller by a routing protocol session, an underlay network route to a destination address assigned to a particular one of the virtual routers;

install, by the SDN controller and within the underlay routing table of the SDN controller, the received underlay network route as an indicator of a reachability status in the underlay network from another one of the plurality of physical network switches to the particular one of the virtual routers;

prior to advertising a VPN route for the at least one virtual network, performing a next hop reachability check to determine whether a corresponding underlay network route for the VPN route exists in the underlay routing table; and control, based on a presence or absence of the underlay network route within the underlay routing table to the particular one of the virtual routers, advertisement of one or more of the VPN routes for the at least one virtual network of the overlay network.

11. The SDN controller of claim 10, wherein to control advertisement of the one or more of the VPN routes comprises withdrawing one or more of the VPN routes for the at least one virtual network of the overlay network when the underlay network route is removed from the routing table of the underlay network in response to detection of reachability failure to the particular one of the virtual routers.

12. The SDN controller of claim 11, wherein to control advertisement of the one or more of the VPN routes comprises advertising one or more of the VPN routes for the at least one virtual network of the overlay network when the underlay network route is installed within the underlay routing table.

13. A method comprising:

installing, within a routing table of a leaf switch of an Internet Protocol (IP) fabric of an underlay network of a data center, an underlay network route to a destination address assigned to a virtual router executing on a compute node, wherein the underlay network route being installed within the routing table provides an indicator of the virtual router being reachable by the leaf switch;

determining, by the leaf switch and via a fault detection protocol session established between the leaf switch and the virtual router, that the virtual router is not responding on the fault detection protocol session; and in response to determining that the virtual router is not responding on the fault detection protocol session, sending, by the leaf switch and toward a spine node that peers with a Software Defined Networking (SDN) controller that manages an overlay network, a route withdrawal message withdrawing the underlay network route to indicate communication failure with the virtual router.

14. The method of claim 13, wherein the fault detection protocol comprises a Bidirectional Forwarding Detection (BFD) protocol.

15. The method of claim 13, further comprising:

prior to determining that the virtual router is not responding to the fault detection protocol session, generating, by the leaf switch, the underlay network route in response to detecting Address Resolution Protocol activity by the compute node.

16. The method of claim 13, further comprising:

prior to determining that the virtual router is not responding to the fault detection protocol session, generating, by the leaf switch, the underlay network route in response to receiving a Border Gateway Protocol (BGP) protocol message advertising the underlay network route over a BGP session between the compute node and the leaf switch, wherein the fault detection protocol session is associated with the BGP session.

17. The method of claim 13, wherein sending the route withdrawal message toward the spine node comprises adding, by the leaf switch and to the route withdrawal message, a Border Gateway Protocol (BGP) community to uniquely identify the virtual router of the compute node.

18. The method of claim 13, wherein determining that the virtual router is not responding on the fault detection protocol session comprises determining based on a link state of a Network Interface Card of the compute node.

19. The method of claim 14, wherein the fault detection protocol session comprises a micro Bidirectional Forwarding Detection (micro BFD) session established on a link to the virtual router as a member link of an Ethernet Switch Identifier link aggregation group (ESI-LAG), wherein the micro BFD session is one of a plurality of micro BFD sessions established on each member link of the ESI-LAG.

20. The method of claim 13, further comprising in response to determining that the virtual router is not responding on the fault detection protocol session, removing, by the leaf switch, the underlay network route from the routing table of the leaf switch.

\* \* \* \* \*